US008417201B1

(12) United States Patent　　(10) Patent No.: US 8,417,201 B1
Schooley　　(45) Date of Patent: Apr. 9, 2013

(54) DUAL PATH MULTI-MODE POWER AMPLIFIER ROUTING ARCHITECTURE

(75) Inventor: Derek Schooley, Oak Ridge, NC (US)

(73) Assignee: RF Micro Devices, Inc., Greensboro, NC (US)

( * ) Notice: Subject to any disclaimer, the term of this patent is extended or adjusted under 35 U.S.C. 154(b) by 232 days.

(21) Appl. No.: 12/822,631

(22) Filed: Jun. 24, 2010

Related U.S. Application Data

(60) Provisional application No. 61/219,999, filed on Jun. 24, 2009.

(51) Int. Cl.
*H04B 1/04* (2006.01)
(52) U.S. Cl. .............. 455/127.4; 455/84; 455/552.1; 455/550.1; 455/83
(58) Field of Classification Search ............... 455/127.4, 455/84, 552.1, 550.1, 83
See application file for complete search history.

(56) References Cited

U.S. PATENT DOCUMENTS

| | | | |
|---|---|---|---|
| 6,188,877 B1 * | 2/2001 | Boesch et al. ................. | 455/74 |
| 7,853,290 B2 * | 12/2010 | Itkin et al. ................. | 455/552.1 |
| 7,983,627 B2 * | 7/2011 | Adler et al. ................. | 455/83 |
| 2003/0193923 A1 * | 10/2003 | Abdelgany et al. ........... | 370/342 |
| 2010/0029227 A1 * | 2/2010 | Narathong et al. ........ | 455/127.1 |
| 2010/0069027 A1 * | 3/2010 | Rofougaran ............... | 455/127.3 |

OTHER PUBLICATIONS

Chung, Y. et al., "Power Level-Dependent Dual-Operating Mode LDMOS Power Amplifier for CDMA Wireless Base-Station Applications," IEEE Transactions on Microwave Theory and Techniques, Feb. 2005, pp. 739-746, vol. 53, No. 2, IEEE.
Chung, Y. et al., "Power routing scheme with dual operating modes: two-way Wilkinson divider and one-way signal path," Electronics Letters, Jan. 22, 2004, pp. 129-120, vol. 40, No. 2, IEEE.
Grebennikov, A. et al., "High-Efficiency Balanced Switched-Path Monolithic SiGe HBT Power Amplifiers for Wireless Applications," 2007 European Conference on Wireless Technologies, Oct. 8-10, 2007, pp. 391-394, IEEE.
Kang, Y.H. et al., "A High Efficient Dual Path Power Amplifer for IS-95 CDMA Handset Applications," 2004 Topical Meeting on Silicon Monolithic Integrated Circuits in RF Systems, Oct. 8-10, 2004, pp. 139-142, IEEE.

* cited by examiner

*Primary Examiner* — Sanh Phu
(74) *Attorney, Agent, or Firm* — Withrow & Terranova, P.L.L.C.

(57) ABSTRACT

The present disclosure relates to multi-mode RF power amplifier (PA) circuitry that may include a first PA path and a second PA path, each of which is fed from a common RF input. During a first operating mode, the first PA path receives and amplifies a first RF input signal via the common RF input, and during a second operating mode, the second PA path receives and amplifies a second RF input signal via the common RF input. To facilitate sharing of the common RF input, during the first operating mode, the second PA path is substantially de-coupled from the common RF input, and during the second operating mode, the first PA path is substantially de-coupled from the common RF input. By sharing the common RF input, size and costs of the multi-mode RF PA circuitry may be reduced.

19 Claims, 15 Drawing Sheets

DUAL PATH MULTI-MODE POWER AMPLIFIER ROUTING ARCHITECTURE

This application claims the benefit of provisional patent application Ser. No. 61/219,999, filed Jun. 24, 2009, the disclosure of which is hereby incorporated herein by reference in its entirety.

FIELD OF THE DISCLOSURE

Embodiments of the present disclosure relate to multiple operating mode radio frequency (RF) power amplifier (PA) circuits, which may be used in RF communications systems.

BACKGROUND OF THE DISCLOSURE

As wireless technology evolves, the number and variations of wireless communications protocols increase and may encompass multiple operating modes, including half duplex modes and full duplex modes, saturated modes and linear modes, multiple frequency bands, various transmit modulation schemes, various transmit power levels, and the like. As a result, wireless communications products may need to provide support for many such protocols. Therefore, RF architectures of wireless products may be complex. Evolving wireless communications protocols may be directed toward transferring as much information as possible, while using as little bandwidth as possible. As a result, certain performance constraints, such as Error Vector Magnitude (EVM) and other linearity constraints, may present significant challenges for wireless communications products. Further, portable wireless products typically are battery powered, need to be as small as possible, and need to have as low a cost as possible. To keep size and costs down, common resources may be used to support as many different functions as possible. To maximize battery life, portable wireless products may include switching power supplies. As such, there is a need to reduce sizes and costs of portable wireless products that use switching power supplies and may support multiple modes, multiples bands, multiple protocols, multiple antennas, or any combination thereof.

SUMMARY OF THE EMBODIMENTS

The present disclosure relates to multi-mode RF power amplifier (PA) circuitry that may include a first PA path and a second PA path, each of which is fed from a common RF input. During a first operating mode, the first PA path receives and amplifies a first RF input signal via the common RF input to provide a first RF output signal, and during a second operating mode, the second PA path receives and amplifies a second RF input signal via the common RF input to provide a second RF output signal. To facilitate sharing of the common RF input, during the first operating mode, the second PA path is substantially de-coupled from the common RF input, and during the second operating mode, the first PA path is substantially de-coupled from the common RF input. By sharing the common RF input, size and costs of the multi-mode RF PA circuitry may be reduced.

In one embodiment of the present disclosure, during both the first and the second operating modes, transceiver circuitry may provide a common RF input signal to the multi-mode RF PA circuitry via the common RF input. By sharing the common RF input, size and costs of the transceiver circuitry may be reduced. During the first operating mode, the common RF input signal may be a Global System for Mobile communications (GSM) transmit signal or an Enhanced Data Rates for GSM Evolution (EDGE) transmit signal, and during the second operating mode, the common RF input signal may be a Wideband Code Division Multiple Access (WCDMA) transmit signal. As a result, during the first operating mode, the first RF input signal may be a GSM transmit signal or an EDGE transmit signal, and during the second operating mode, the second RF input signal may be a WCDMA transmit signal. Further, during the first operating mode, the multi-mode RF PA circuitry may operate in a half duplex mode, and during the second operating mode, the multi-mode RF PA circuitry may operate in a full duplex mode.

In one embodiment of the present disclosure, the first PA path may include multiple PA stages coupled in series including a first input stage, and the second PA path may include multiple PA stages coupled in series, including a second input stage. An input to the first input stage provides an input impedance to the first stage, such that during the second operating mode, the input impedance to the first input stage is high enough to substantially de-couple the first PA path from the common RF input. Further, the input to the first input stage may be coupled to a base of a first heterojunction bipolar transistor (HBT) element. Similarly, an input to the second input stage provides an input impedance to the second stage, such that during the first operating mode, the input impedance to the second input stage is high enough to substantially de-couple the second PA path from the common RF input. Further, the input to the second input stage may be coupled to the base of a second HBT element. In one embodiment of the first input stage, the first HBT element is a Gallium Arsenide (GaAs) HBT element. Similarly, in one embodiment of the second input stage, the second HBT element is a GaAs HBT element. Using HBT elements may provide high enough input impedances to effectively de-couple the first and second input stages from the common RF input.

In one embodiment of the present disclosure, an amplitude modulation (AM) power supply may provide envelope power to any or all of the PA stages of the first PA path and may provide envelope power to any or all of the PA stages of the second PA path. As such, in one embodiment of the multi-mode RF PA circuitry, during the first operating mode, any or all of the PA stages of the first PA path operate in a saturated mode and the remainder, if any, of the PA stages of the first PA path operate in a linear mode, and during the second operating mode, all of the PA stages of the second PA path operate in a linear mode. In an alternate embodiment of the multi-mode RF PA circuitry, during the second operating mode, any or all of the PA stages of the second PA path operate in a saturated mode and the remainder, if any, of the PA stages of the second PA path operate in a linear mode, and during the first operating mode, all of the PA stages of the first PA path operate in a linear mode. In an additional embodiment of the multi-mode RF PA circuitry, during the first operating mode, any or all of the PA stages of the first PA path operate in a saturated mode and the remainder, if any, of the PA stages of the first PA path operate in a linear mode, and during the second operating mode, any or all of the PA stages of the second PA path operate in a saturated mode and the remainder, if any, of the PA stages of the second PA path operate in a linear mode.

In an alternate embodiment of the present disclosure, either the first PA path or the second PA path is a quadrature amplifier PA path, which may include an in-phase amplifier path and a quadrature-phase amplifier path. The in-phase amplifier path may include multiple PA stages coupled in series, such that any or all of the in-phase PA stages may receive power from the AM power supply, and any or all of the in-phase PA stages may operate in a saturated mode and the remainder, if any, of the in-phase PA stages may operate in a linear mode.

Similarly, the quadrature-phase amplifier path may include multiple PA stages coupled in series, such that any or all of the quadrature-phase PA stages may receive power from the AM power supply, and any or all of the quadrature-phase PA stages may operate in a saturated mode and the remainder, if any, of the quadrature-phase PA stages may operate in a linear mode. In an additional embodiment of the present disclosure, both the first PA path and the second PA path are quadrature amplifier PA paths, such that the first PA path includes a first in-phase amplifier path and a first quadrature-phase amplifier path and the second PA path includes a second in-phase amplifier path and a second quadrature-phase amplifier path.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION OF THE PREFERRED EMBODIMENTS

Figure 1:
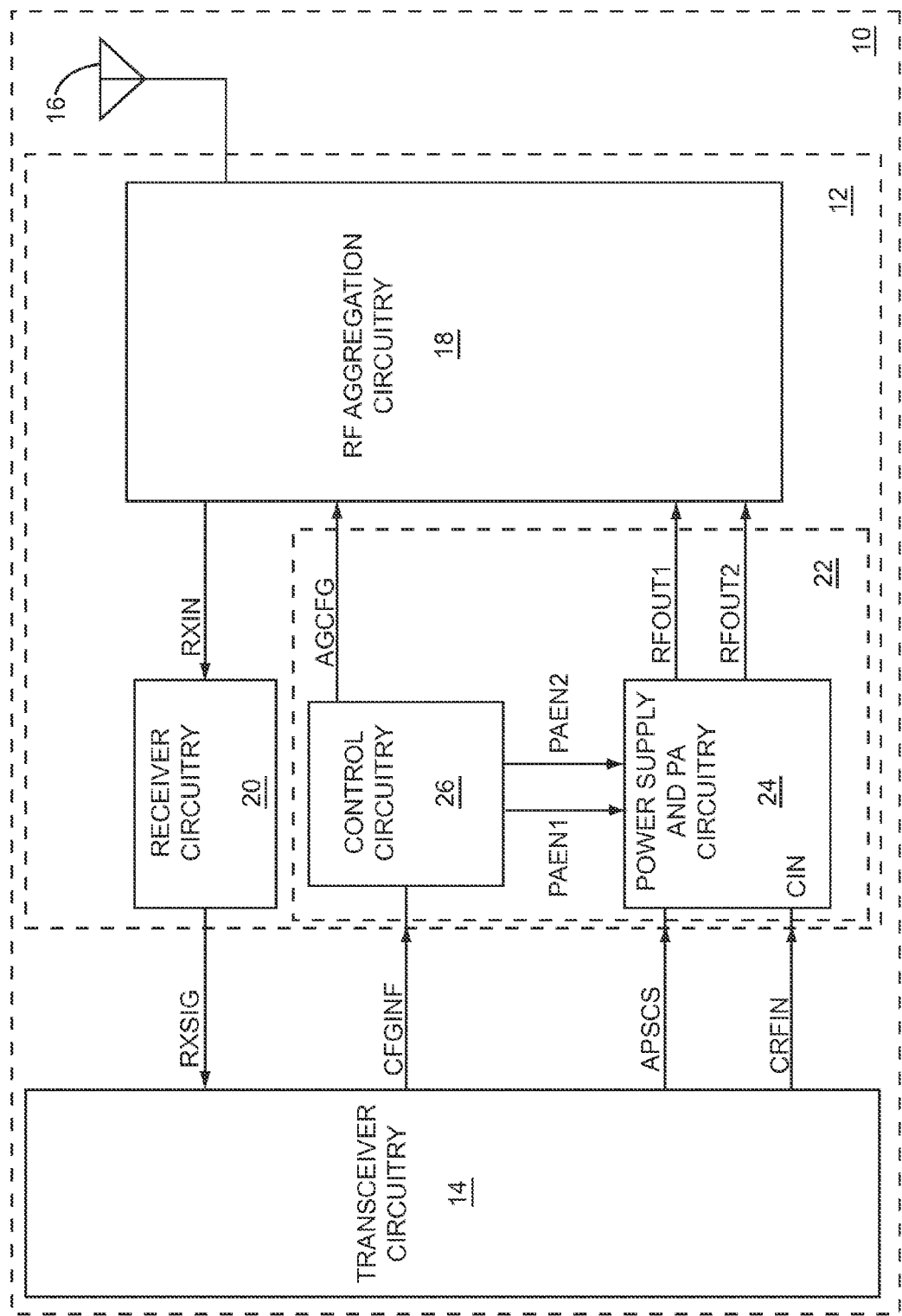
FIG. 1 shows details of an RF communications terminal according to one embodiment of the RF communications terminal.

The embodiments set forth below represent the necessary information to enable those skilled in the art to practice the disclosure and illustrate the best mode of practicing the disclosure. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

The present disclosure relates to multi-mode RF power amplifier (PA) circuitry that may include a first PA path and a second PA path, each of which is fed from a common RF input. During a first operating mode, the first PA path receives and amplifies a first RF input signal via the common RF input to provide a first RF output signal, and during a second operating mode, the second PA path receives and amplifies a second RF input signal via the common RF input to provide a second RF output signal. To facilitate sharing of the common RF input, during the first operating mode, the second PA path is substantially de-coupled from the common RF input, and during the second operating mode, the first PA path is substantially de-coupled from the common RF input. By sharing the common RF input, size and costs of the multi-mode RF PA circuitry may be reduced.

In one embodiment of the present disclosure, during both the first and the second operating modes, transceiver circuitry may provide a common RF input signal to the multi-mode RF PA circuitry via the common RF input. By sharing the common RF input, size and costs of the transceiver circuitry may be reduced. During the first operating mode, the common RF input signal may be a Global System for Mobile communications (GSM) transmit signal or an Enhanced Data Rates for GSM Evolution (EDGE) transmit signal, and during the second operating mode, the common RF input signal may be a Wideband Code Division Multiple Access (WCDMA) transmit signal. As a result, during the first operating mode, the first RF input signal may be a GSM transmit signal or an EDGE transmit signal, and during the second operating mode, the second RF input signal may be a WCDMA transmit signal. Further, during the first operating mode, the multi-mode RF PA circuitry may operate in a half duplex mode, and during the second operating mode, the multi-mode RF PA circuitry may operate in a full duplex mode.

In one embodiment of the present disclosure, the first PA path may include multiple PA stages coupled in series including a first input stage, and the second PA path may include multiple PA stages coupled in series, including a second input stage. An input to the first input stage provides an input impedance to the first stage, such that during the second operating mode, the input impedance to the first input stage is high enough to substantially de-couple the first PA path from the common RF input. Further, the input to the first input stage may be coupled to a base of a first heterojunction bipolar transistor (HBT) element. Similarly, an input to the second input stage provides an input impedance to the second stage, such that during the first operating mode, the input impedance to the second input stage is high enough to substantially de-couple the second PA path from the common RF input. Further, the input to the second input stage may be coupled to the base of a second HBT element. In one embodiment of the first input stage, the first HBT element is a Gallium Arsenide (GaAs) HBT element. Similarly, in one embodiment of the second input stage, the second HBT element is a GaAs HBT element. Using HBT elements may provide high enough input impedances to effectively de-couple the first and second input stages from the common RF input.

In one embodiment of the present disclosure, an amplitude modulation (AM) power supply may provide envelope power to any or all of the PA stages of the first PA path and may provide envelope power to any or all of the PA stages of the second PA path. As such, in one embodiment of the multi-mode RF PA circuitry, during the first operating mode, any or all of the PA stages of the first PA path operate in a saturated mode and the remainder, if any, of the PA stages of the first PA path operate in a linear mode, and during the second operating mode, all of the PA stages of the second PA path operate in a linear mode. In an alternate embodiment of the multi-mode RF PA circuitry, during the second operating mode, any or all of the PA stages of the second PA path operate in a saturated mode and the remainder, if any, of the PA stages of the second PA path operate in a linear mode, and during the first operating mode, all of the PA stages of the first PA path operate in a linear mode. In an additional embodiment of the multi-mode RF PA circuitry, during the first operating mode, any or all of the PA stages of the first PA path operate in a saturated mode and the remainder, if any, of the PA stages of the first PA path operate in a linear mode, and during the second operating mode, any or all of the PA stages of the second PA path operate in a saturated mode and the remainder, if any, of the PA stages of the second PA path operate in a linear mode.

In an alternate embodiment of the present disclosure, either the first PA path or the second PA path is a quadrature amplifier PA path, which may include an in-phase amplifier path and a quadrature-phase amplifier path. The in-phase amplifier path may include multiple PA stages coupled in series, such that any or all of the in-phase PA stages may receive power from the AM power supply, and any or all of the in-phase PA stages may operate in a saturated mode and the remainder, if any, of the in-phase PA stages may operate in a linear mode. Similarly, the quadrature-phase amplifier path may include multiple PA stages coupled in series, such that any or all of the quadrature-phase PA stages may receive power from the AM power supply, and any or all of the quadrature-phase PA stages may operate in a saturated mode and the remainder, if any, of the quadrature-phase PA stages may operate in a linear mode. In an additional embodiment of the present disclosure, both the first PA path and the second PA path are quadrature amplifier PA paths, such that the first PA path includes a first in-phase amplifier path and a first quadrature-phase amplifier path and the second PA path includes a second in-phase amplifier path and a second quadrature-phase amplifier path.

FIG. 1 shows details of an RF communications terminal 10 according to one embodiment of the RF communications terminal 10. The RF communications terminal 10 includes RF front-end circuitry 12, transceiver circuitry 14, and an antenna 16. The RF front-end circuitry 12 includes RF aggregation circuitry 18, receiver circuitry 20, and multi-mode RF PA circuitry 22, which includes power supply and PA circuitry 24 and control circuitry 26. The RF aggregation circuitry 18 is coupled between the receiver circuitry 20 and the antenna 16 and is coupled between the power supply and PA circuitry 24 and the antenna 16. The RF communications terminal 10 may transmit and receive RF signals using the antenna 16. The RF aggregation circuitry 18 may receive the RF signals and provide one or more receive input signal RXIN to the receiver circuitry 20 based on the received RF signals. Further, the RF aggregation circuitry 18 may receive a first RF output signal RFOUT1 and a second RF output signal RFOUT2 from the power supply and PA circuitry 24 and provide transmit signals to the antenna 16 based on either the first RF output signal RFOUT1 or the second RF output signal RFOUT2, based on the multi-mode RF PA circuitry 22 operating in either the first operating mode or the second operating mode, respectively. As such, the RF aggregation circuitry 18 may include RF switching circuitry, bandpass filters, duplexers, diplexers, RF switches, impedance matching networks, other RF filters, RF amplifiers, RF power detectors, the like, or any combination thereof. The control circuitry 26 may configure the RF aggregation circuitry 18 for proper operation using one or more aggregation configuration signal AGCFG based on whether the multi-mode RF PA circuitry 22 is operating in the first operating mode or the second operating mode.

The receiver circuitry 20 receives the one or more receive input signal RXIN and provides one or more receive signal RXSIG to the transceiver circuitry 14 based on the one or more receive input signal RXIN. The receiver circuitry 20 may include filtering circuitry, amplification circuitry, down conversion circuitry, the like, or any combination thereof. In one embodiment of the receiver circuitry 20, the receiver circuitry 20 is multi-band receiver circuitry and may include many parallel receive paths, such that each receive path may be associated with one or more receive band.

The transceiver circuitry 14 is coupled to a common RF input CIN of the power supply and PA circuitry 24 and provides a common RF input signal CRFIN to the power supply and PA circuitry 24 via the common RF input CIN. Further, the transceiver circuitry 14 provides an AM power supply control signal APSCS to the power supply and PA circuitry 24. During the first operating mode, a first PA path in the power supply and PA circuitry 24 receives and amplifies the common RF input signal CRFIN to provide the first RF output signal RFOUT1. During the second operating mode, a second PA path in the power supply and PA circuitry 24 receives and amplifies the common RF input signal CRFIN to provide the second RF output signal RFOUT2.

The control circuitry 26 receives configuration information CFGINF from the transceiver circuitry 14 and selects between the first operating mode and the second operating mode and provides the one or more aggregation configuration signal AGCFG based on the configuration information CFGINF. Further, the control circuitry 26 provides a first power amplifier enable signal PAEN1 and a second power amplifier enable signal PAEN2 to the power supply and PA circuitry 24 to configure the power supply and PA circuitry 24 for proper operation, depending on which operating mode is selected.

In a first exemplary embodiment of the RF communications terminal 10, the RF communications terminal 10 is a multi-band RF communications terminal. In a second exemplary embodiment of the RF communications terminal 10, the RF communications terminal 10 is a multi-mode RF communications terminal. In a third exemplary embodiment of the RF communications terminal 10, the RF communications terminal 10 is a multi-mode multi-band RF communications terminal. A multi-mode RF communications terminal may operate using simplex communications, using half-duplex communications, using full duplex communications, operate in a saturated mode, operate in a linear mode, or simultaneously using any combination thereof. A multi-band RF communications terminal may transmit, receive, or both, RF signals using any of a number RF communications bands. A multi-mode multi-band RF communications terminal may combine the functionality of the multi-mode RF communications terminal and the functionality of the multi-band RF communications terminal. As such, other embodiments of the RF communications terminal 10 may use additional RF transmit signals, RF receive signals, or both.

Figure 2:
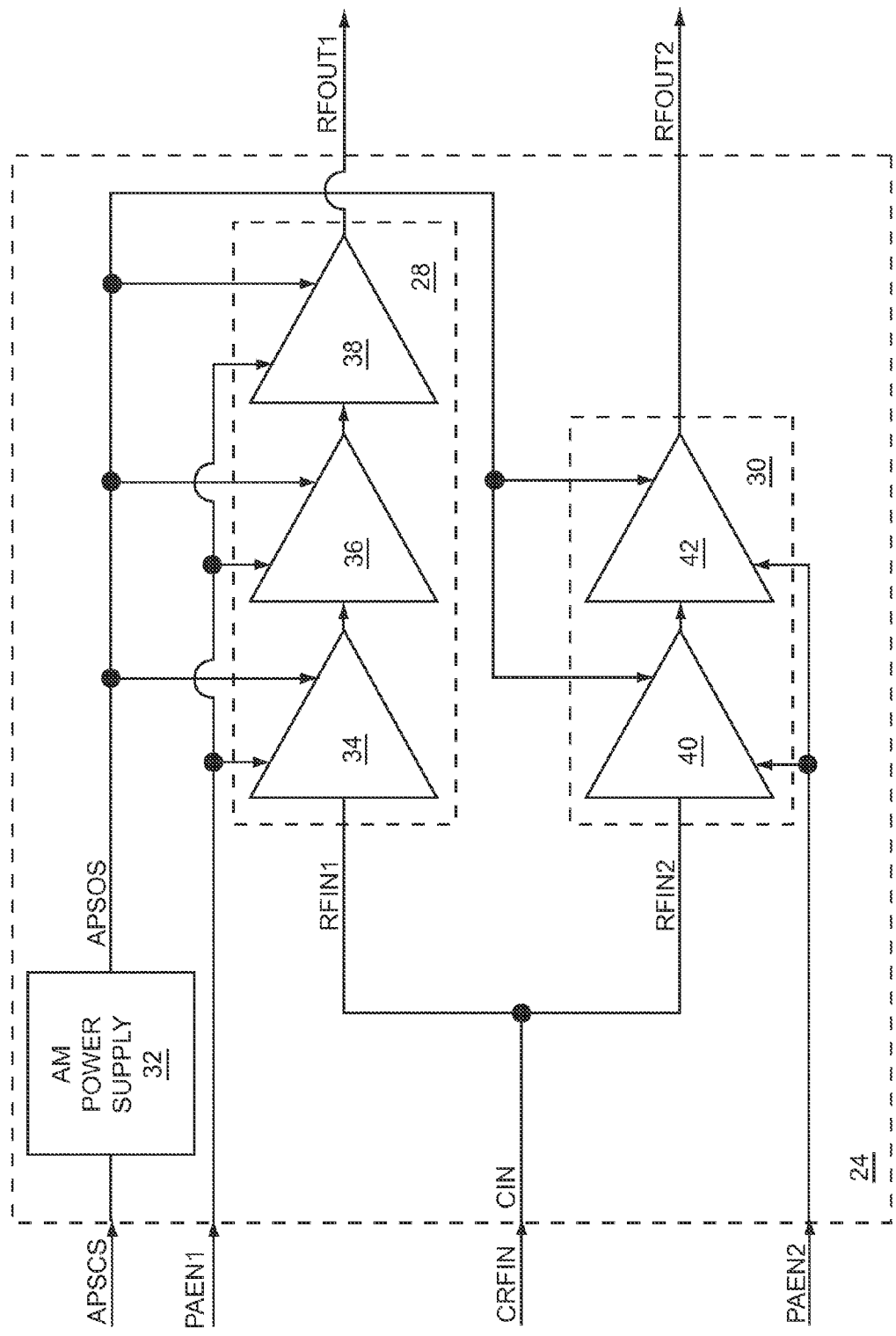
FIG. 2 shows details of power supply and PA circuitry illustrated in FIG. 1 according to one embodiment of the power supply and PA circuitry.

FIG. 2 shows details of the power supply and PA circuitry 24 illustrated in FIG. 1 according to one embodiment of the power supply and PA circuitry 24. The power supply and PA circuitry 24 includes a first PA path 28, a second PA path 30, and an AM power supply 32. The first PA path 28 includes a first input stage 34, a first intermediate stage 36, and a first final stage 38 coupled in series, such that the first input stage 34 feeds the first intermediate stage 36, which feeds the first final stage 38. The second PA path 30 includes a second input stage 40 and a second final stage 42 coupled in series, such that the second input stage 40 feeds the second final stage 42.

During the first operating mode, the first PA path 28 receives and amplifies a first RF input signal RFIN1 to provide the first RF output signal RFOUT1. Similarly, during the second operating mode, the second PA path 30 receives and amplifies a second RF input signal RFIN2 to provide the second RF output signal RFOUT2. The common RF input CIN is coupled directly to an input to the first input stage 34 and to an input to the second input stage 40. As previously mentioned, the common RF input CIN receives the common RF input signal CRFIN. Therefore, during the first operating mode, the first RF input signal RFIN1 is essentially equivalent to the common RF input signal CRFIN and during the second operating mode, the second RF input signal RFIN2 is substantially equivalent to the common RF input signal CRFIN.

During the first operating mode, the first input stage 34 receives the first RF input signal RFIN1 and the first final stage 38 provides the first RF output signal RFOUT1 based on amplifying the first RF input signal RFIN1. Further, during the first operating mode, an input impedance to the first input stage 34 may be on the order of a nominal value, such as about 50 ohms. Similarly, during the second operating mode, the second input stage 40 receives the second RF input signal RFIN2 and the second final stage 42 provides the second RF output signal RFOUT2 based on amplifying the second RF input signal RFIN2. Further, during the second operating mode, an input impedance to the second input stage 40 may be on the order of the nominal value, such as about 50 ohms. Additionally, during the first operating mode, the input impedance to the second input stage 40 is high enough to substantially de-couple the second PA path 30 from the common RF input CIN and during the second operating mode, the input impedance to the first input stage 34 is high enough to substantially de-couple the first PA path 28 from the common RF input CIN.

The common RF input signal CRFIN may include AM, phase modulation (PM), frequency modulation (FM), or any combination thereof. In an exemplary embodiment of the common RF input signal CRFIN, the common RF input signal CRFIN is a polar-modulated RF signal. Polar modulation is a combination of AM and PM and is well known in the art. In a first embodiment of the common RF input signal CRFIN, during the first operating mode, the common RF input signal CRFIN is a GSM transmit signal, and during the second operating mode, the common RF input signal CRFIN is a WCDMA transmit signal. In a second embodiment of the common RF input signal CRFIN, during the first operating mode, the common RF input signal CRFIN is an EDGE transmit signal, and during the second operating mode, the common RF input signal CRFIN is a WCDMA transmit signal.

The AM power supply 32 receives the AM power supply control signal APSCS and provides envelope power via an AM power supply output signal APSOS to the first input stage 34, the first intermediate stage 36, the first final stage 38, the second input stage 40, and the second final stage 42 based on the AM power supply control signal APSCS. The AM power supply 32 may include switching power supply circuitry, linear power supply circuitry, or both to realize an optimal trade-off between efficiency and linearity.

Alternate embodiments of the first PA path 28 may include any number of stages. Further, any or all of the first stages 34, 36, 38 may not receive power via the AM power supply output signal APSOS. Similarly, alternate embodiments of the second PA path 30 may include any number of stages. Further, any or all of the second stages 40, 42 may not receive power via the AM power supply output signal APSOS. Stages not receiving power via the AM power supply output signal APSOS may receive power from other sources, such as alternate power supplies, directly from a battery, or both.

During the first operating mode, any or all of the first stages 34, 36, 38 may operate in a saturated mode and the remainder, if any, of the first stages 34, 36, 38 may operate in a linear mode. Similarly, during the second operating mode, any or all of the second stages 40, 42 may operate in a saturated mode and the remainder, if any, of the second stages 40, 42 may operate in a linear mode. In an exemplary embodiment of the power supply and PA circuitry 24, none of the second stages 40, 42 receive the AM power supply output signal APSOS, during the second operating mode, all of the second stages 40, 42 operate in the linear mode, and during the first operating mode, at least one of the first stages 34, 36, 38 operate in the saturated mode.

The first stages 34, 36, 38 receive the first power amplifier enable signal PAEN1 from the control circuitry 26. As such, the control circuitry 26 may enable or disable the first stages 34, 36, 38 via the first power amplifier enable signal PAEN1. During the first operating mode, the first stages 34, 36, 38 are enabled and during the second operating mode, the first stages 34, 36, 38 are disabled. When the first input stage 34 is disabled, the input impedance to the first input stage 34 is high enough to substantially de-couple the first PA path 28 from the common RF input CIN. Any or all of the first stages 34, 36, 38 may be enabled and disabled by controlling bias circuitry in each of the respective first stages 34, 36, 38. As such, in one embodiment of the first power amplifier enable signal PAEN1, the first power amplifier enable signal PAEN1 is a first bias signal. In alternate embodiments of the first PA path 28, the first intermediate stage 36, the first final stage 38, or both may not receive the first power amplifier enable signal PAEN1. Therefore, during the second operating mode, the first intermediate stage 36, the first final stage 38, or both may remain enabled.

The second stages 40, 42 receive the second power amplifier enable signal PAEN2 from the control circuitry 26. As such, the control circuitry 26 may enable or disable the second stages 40, 42 via the second power amplifier enable signal PAEN2. During the first operating mode, the second stages 40, 42 are disabled and during the second operating mode, the second stages 40, 42 are enabled. When the second input stage 40 is disabled, the input impedance to the second input stage 40 is high enough to substantially de-couple the second PA path 30 from the common RF input CIN. Any or all of the second stages 40, 42 may be enabled and disabled by controlling bias circuitry in each of the respective second stages 40, 42. As such, in one embodiment of the second power amplifier enable signal PAEN2, the second power amplifier enable signal PAEN2 is a second bias signal. In alternate embodiments of the second PA path 30, the second final stage 42 may not receive the second power amplifier enable signal PAEN2. Therefore, during the first operating mode, the second final stage 42 may remain enabled.

As mentioned above, in one embodiment of the control circuitry 26 (FIG. 1), the control circuitry 26 selects between the first operating mode and the second operating mode. Selection of the operating mode may be based on the configuration information CFGINF. As such, the transceiver circuitry 14 may initiate selection of the operating mode. During the first operating mode, the RF communications terminal 10 may transmit the first RF output signal RFOUT1 from the first final stage 38 and the AM power supply 32 may provide envelope power to the first input stage 34, to the first intermediate stage 36, and to the first final stage 38 via the AM power supply output signal APSOS. During the second operating mode, the RF communications terminal 10 may transmit the second RF output signal RFOUT2 from the second final stage 42 and the AM power supply 32 may provide envelope power to the second input stage 40 and to the second final stage 42 via the AM power supply output signal APSOS.

Figure 3:
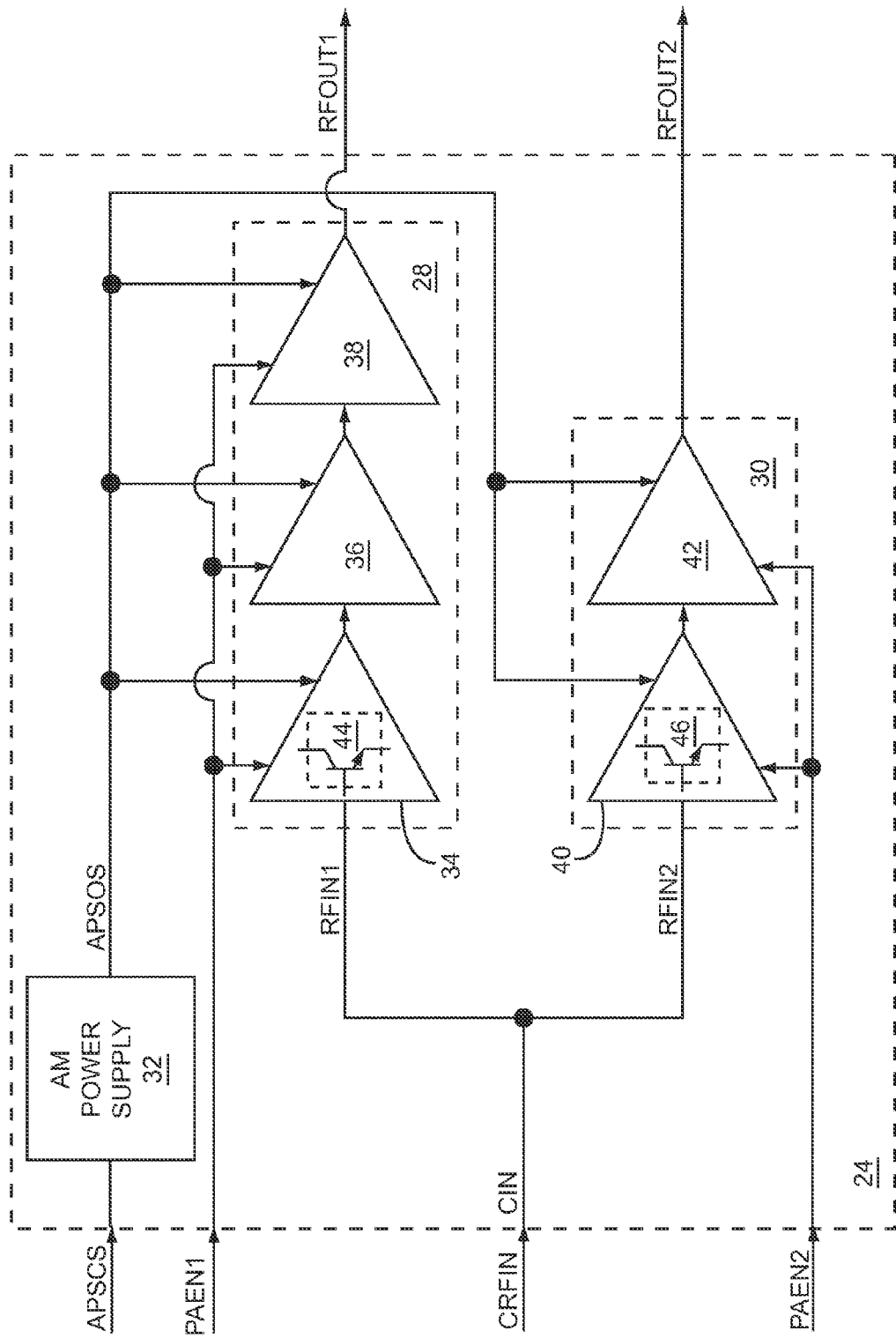
FIG. 3 shows details of a first input stage and a second input stage illustrated in FIG. 2 according to one embodiment of the first input stage and the second input stage.

FIG. 3 shows details of the first input stage 34 and the second input stage 40 illustrated in FIG. 2 according to one embodiment of the first input stage 34 and the second input stage 40. The power supply and PA circuitry 24 illustrated in FIG. 3 is similar to the power supply and PA circuitry 24 illustrated in FIG. 2, except in the power supply and PA circuitry 24 illustrated in FIG. 3, the first input stage 34 includes a first HBT element 44, such that a base of the first HBT element 44 is coupled to the input of the first input stage 34 and the input to the first input stage 34 provides the input impedance to the first input stage 34. In one embodiment of the first HBT element 44, the first HBT element 44 is a Gallium Arsenide (GaAs) HBT element. As previously mentioned, during the second operating mode, the input impedance to the first input stage 34 is high enough to substantially de-couple the first PA path 28 from the common RF input CIN. Therefore, using an HBT or a GaAs HBT in the first input stage 34 may help provide the proper input impedance to the first input stage 34 during the second operating mode.

Similarly, the second input stage 40 includes a second HBT element 46, such that a base of the second HBT element 46 is coupled to the input of the second input stage 40 and the input to the second input stage 40 provides the input impedance to the second input stage 40. In one embodiment of the second HBT element 46, the second HBT element 46 is a GaAs HBT element. As previously mentioned, during the first operating mode, the input impedance to the second input stage 40 is high enough to substantially de-couple the second PA path 30 from the common RF input CIN. Therefore, using an HBT or a GaAs HBT in the second input stage 40 may help provide the proper input impedance to the second input stage 40 during the second operating mode.

Figure 4:
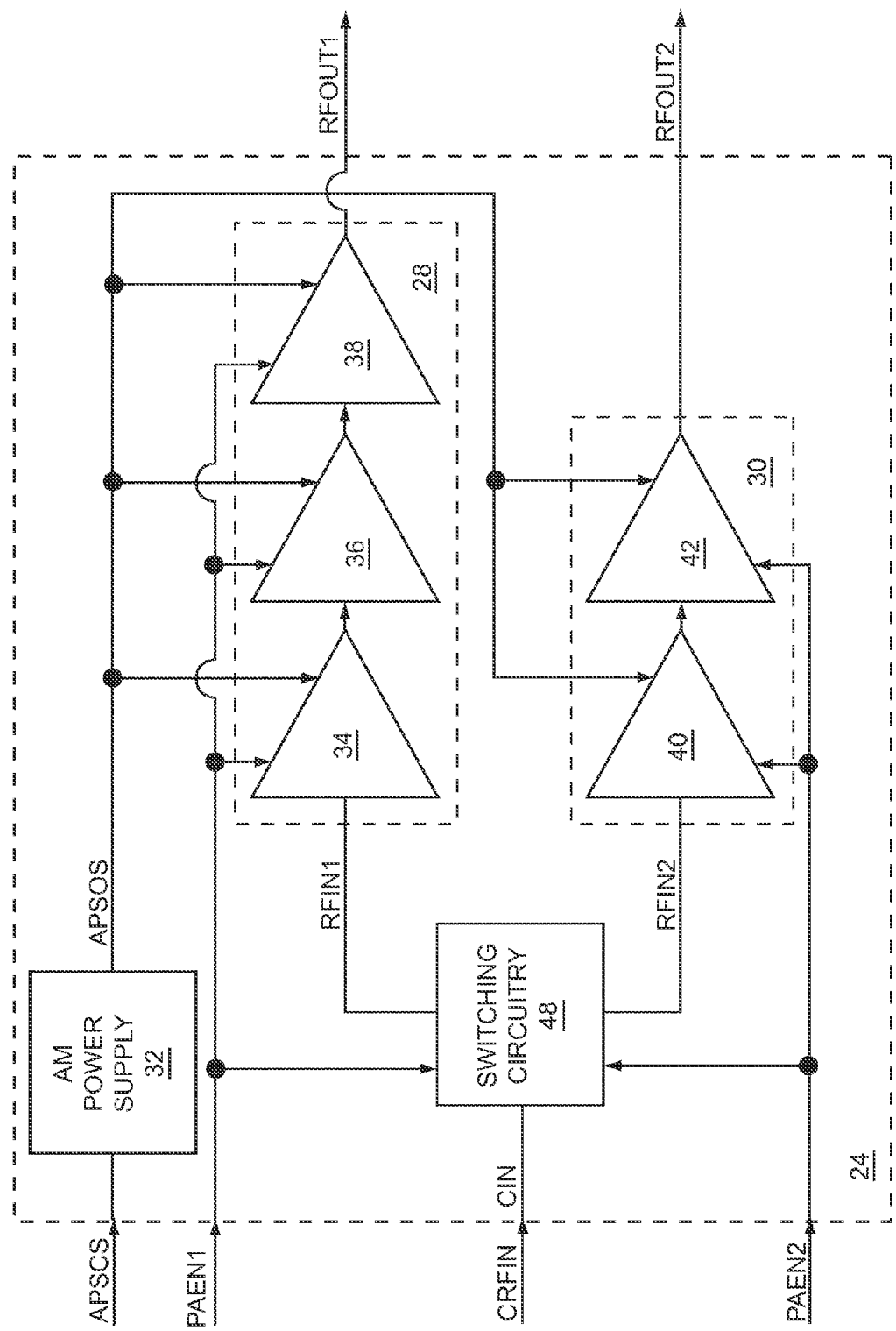
FIG. 4 shows details of the power supply and PA circuitry illustrated in FIG. 1.

FIG. 4 shows details of the power supply and PA circuitry 24 illustrated in FIG. 1. The power supply and PA circuitry 24 illustrated in FIG. 4 is similar to the power supply and PA circuitry 24 illustrated in FIG. 2, except the power supply and PA circuitry 24 illustrated in FIG. 4 further includes switching circuitry 48 coupled between the common RF input CIN and the input to the first input stage 34 and coupled between the common RF input CIN and the input to the second input stage 40. The switching circuitry 48 receives the first power amplifier enable signal PAEN1 and the second power amplifier enable signal PAEN2 to control switching behavior, such that during the first operating mode, the switching circuitry 48 couples the common RF input CIN to the input to the first input stage 34 and substantially de-couples the common RF input CIN from the input to the second input stage 40. Further, during the second operating mode, the switching circuitry 48 couples the common RF input CIN to the input to the second input stage 40 and substantially de-couples the common RF input CIN from the input to the first input stage 34. The switching behavior of the switching circuitry 48 may be based on the first power amplifier enable signal PAEN1, the second power amplifier enable signal PAEN2, or both the first power amplifier enable signal PAEN1 and the second power amplifier enable signal PAEN2.

Figure 5:
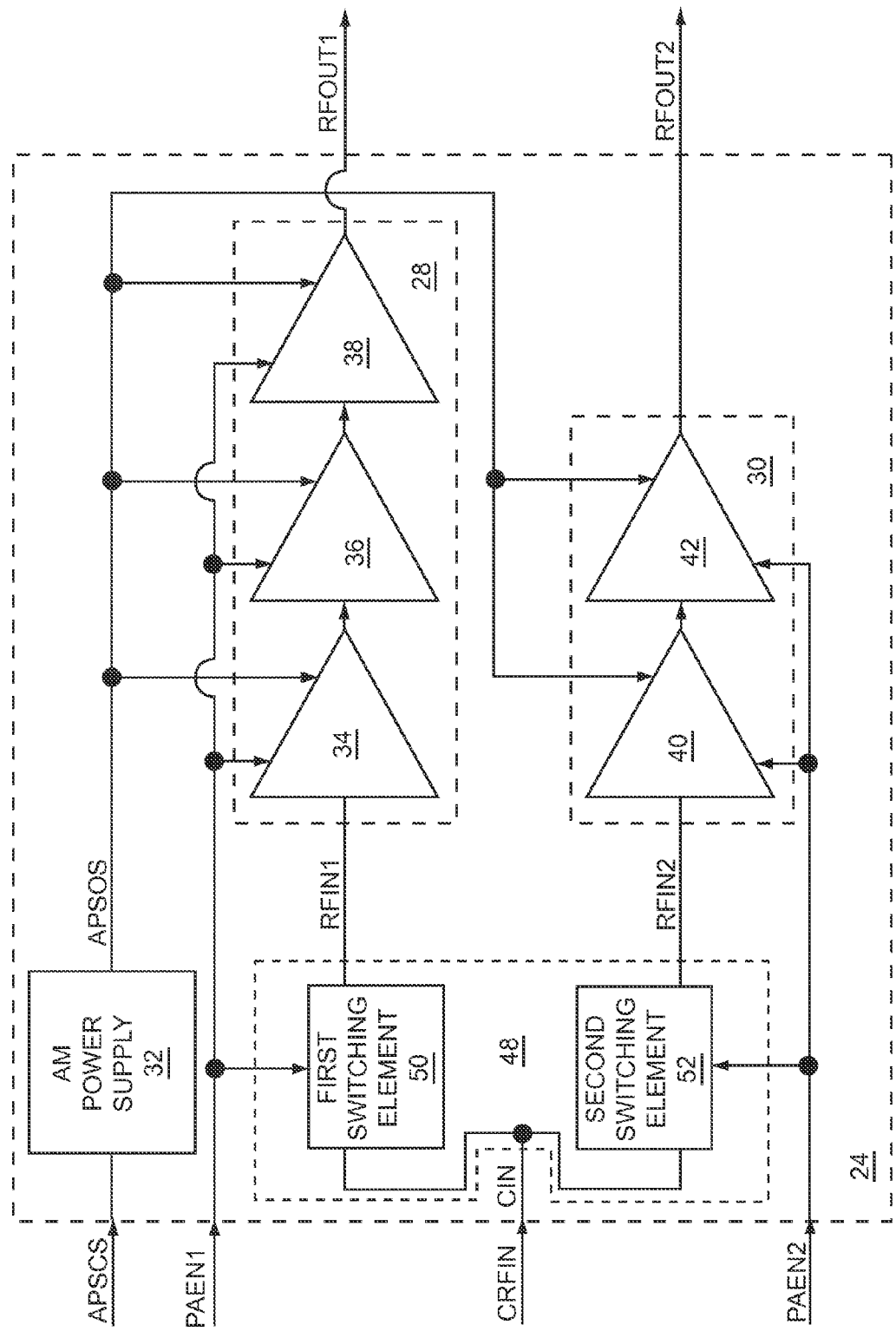
FIG. 5 shows details of switching circuitry illustrated in FIG. 4.

FIG. 5 shows details of the switching circuitry 48 illustrated in FIG. 4. The switching circuitry 48 illustrated in FIG. 5 includes a first switching element 50 and a second switching element 52. The first switching element 50 is coupled between the common RF input CIN and the input to the first input stage 34 and receives the first power amplifier enable signal PAEN1. The first power amplifier enable signal PAEN1 controls the first switching element 50, such that during the first operating mode, the first switching element 50 is in a CLOSED state, thereby coupling the common RF input CIN to the input to the first input stage 34, and during the second operating mode, the first switching element 50 is in an OPEN state, thereby substantially de-coupling the common RF input CIN from the input to the first input stage 34. Similarly, the second switching element 52 is coupled between the common RF input CIN and the input to the second input stage 40 and receives the second power amplifier enable signal PAEN2. The second power amplifier enable signal PAEN2 controls the second switching element 52, such that during the first operating mode, the second switching element 52 is in an OPEN state, thereby substantially de-coupling the common RF input CIN from the input to the second input stage 40, and during the second operating mode, the second switching element 52 is in a CLOSED state, thereby coupling the common RF input CIN to the input to the second input stage 40.

Figure 6:
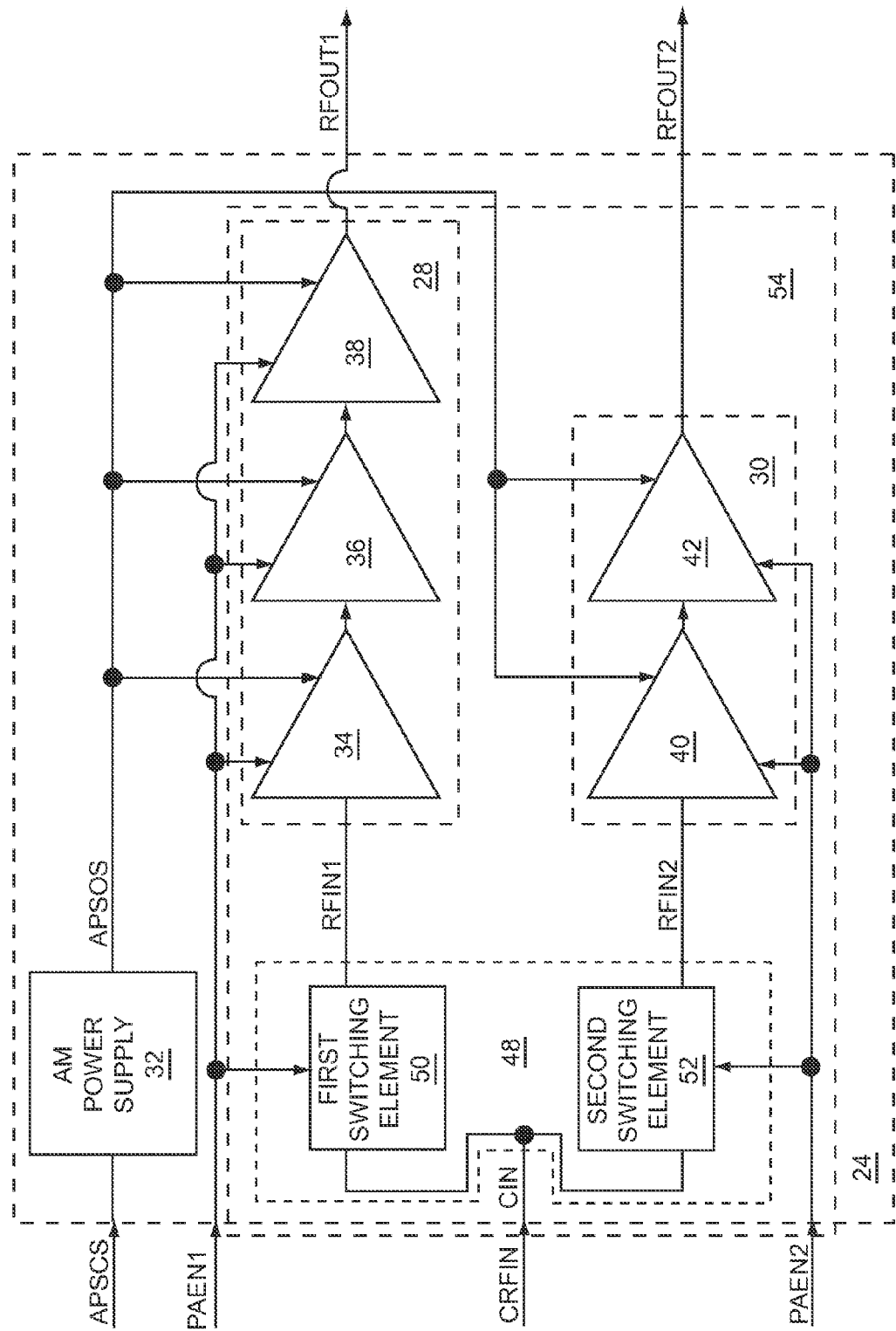
FIG. 6 shows details of the power supply and PA circuitry illustrated in FIG. 5.

FIG. 6 shows details of the power supply and PA circuitry 24 illustrated in FIG. 5. The power supply and PA circuitry 24 illustrated in FIG. 6 is similar to the power supply and PA circuitry 24 illustrated in FIG. 5, except in the power supply and PA circuitry 24 illustrated in FIG. 6, the first PA path 28, the second PA path 30, the first switching element 50, and the second switching element 52 are integrated in a common semiconductor die 54. Such integration may reduce size and cost of the RF communications terminal 10.

Figure 7:
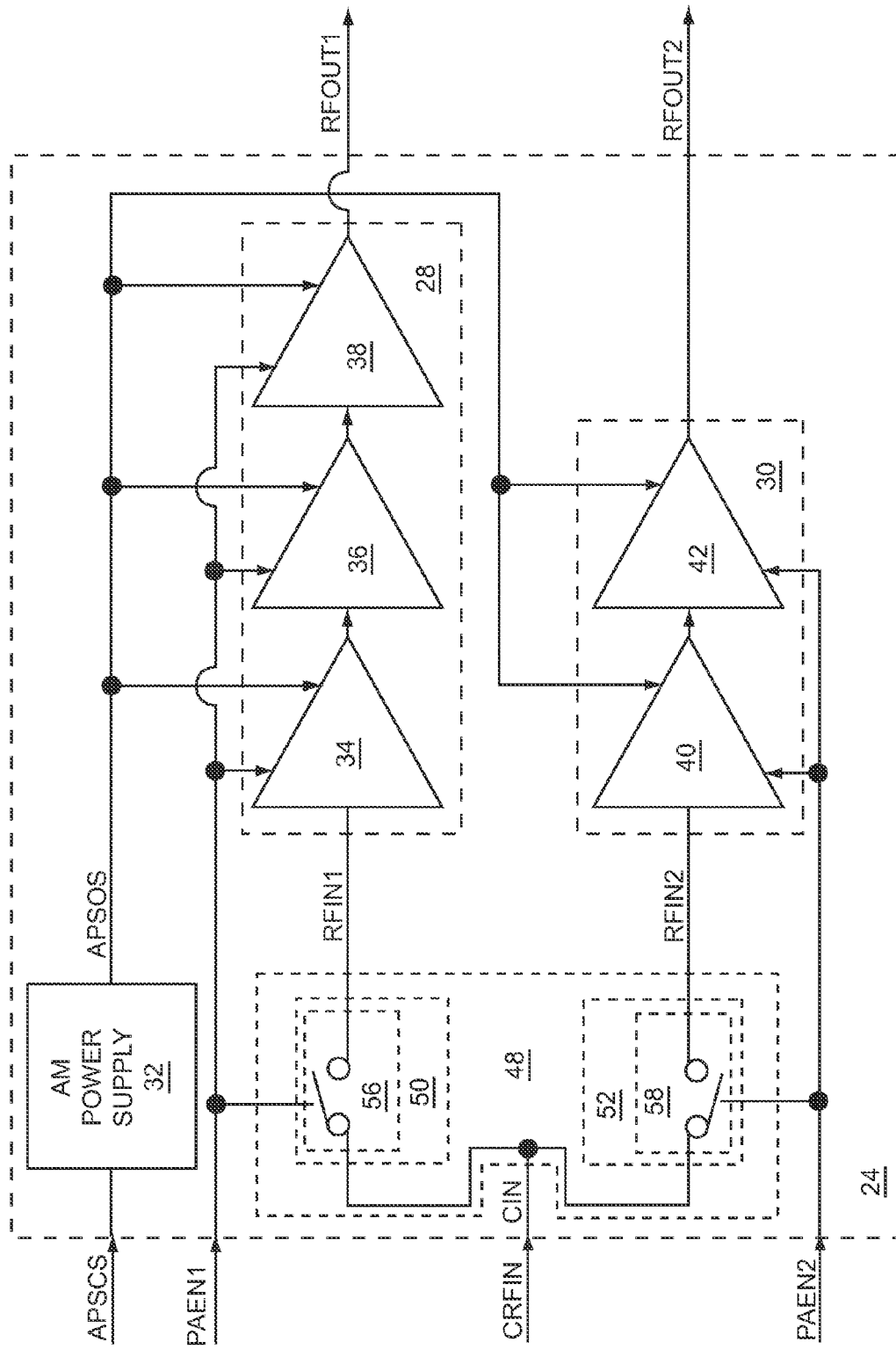
FIG. 7 shows details of the switching circuitry illustrated in FIG. 5.

FIG. 7 shows details of the switching circuitry 48 illustrated in FIG. 5. The power supply and PA circuitry 24 illustrated in FIG. 7 is similar to the power supply and PA circuitry 24 illustrated in FIG. 5, except in the power supply and PA circuitry 24 illustrated in FIG. 7, the first switching element 50 includes a first micro-electro-mechanical systems (MEMS) switching element 56 and the second switching element 52 includes a second MEMS switching element 58. Switching contacts of the first MEMS switching element 56 are coupled between the common RF input CIN and the input to the first input stage 34. Similarly, switching contacts of the second MEMS switching element 58 are coupled between the common RF input CIN and the input to the second input stage 40. An actuator of the first MEMS switching element 56 may receive the first power amplifier enable signal PAEN1 and an actuator of the second MEMS switching element 58 may receive the second power amplifier enable signal PAEN2.

Figure 8:
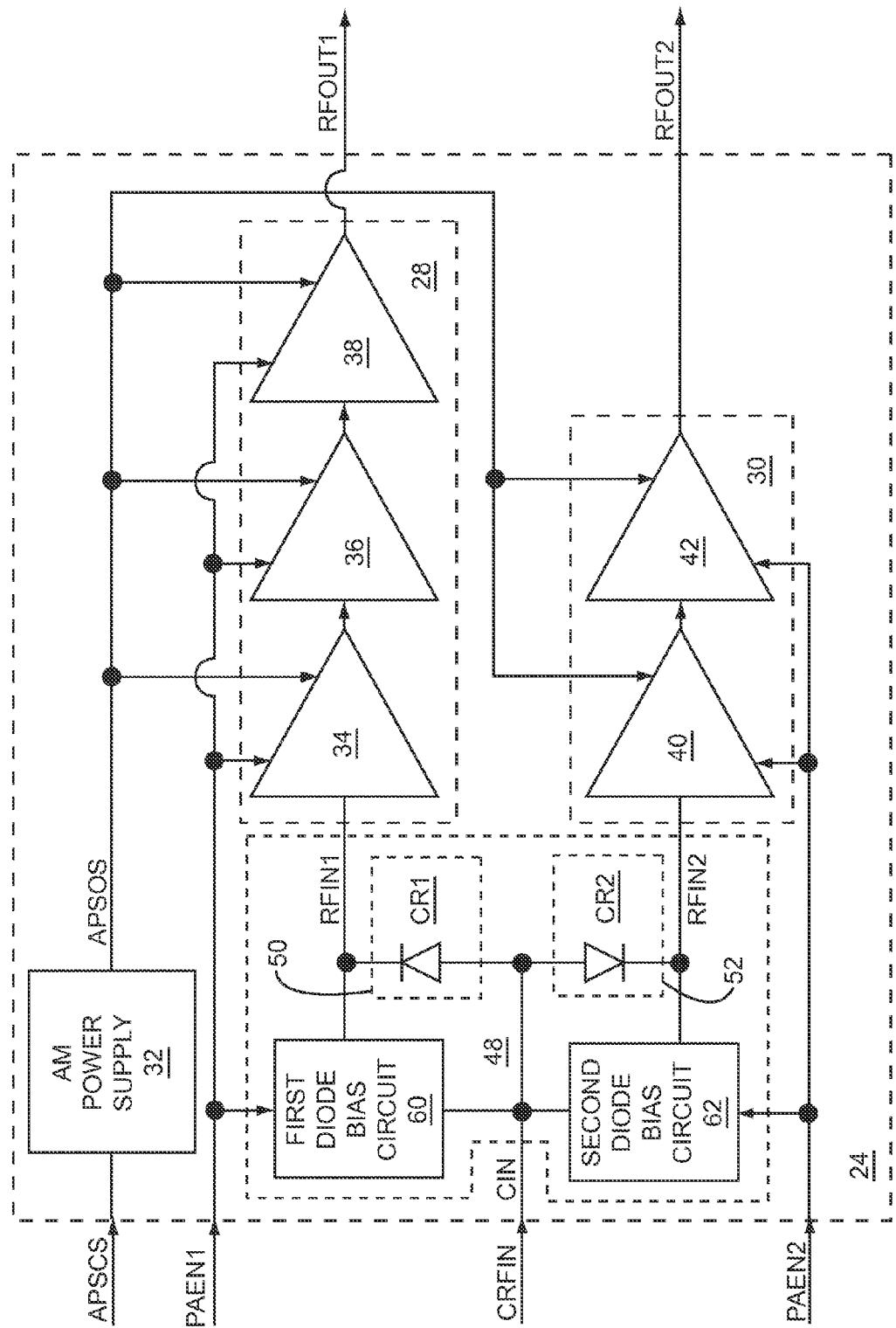
FIG. 8 shows details of the switching circuitry 48 illustrated in FIG. 5.

FIG. 8 shows details of the switching circuitry 48 illustrated in FIG. 5. P-type material, intrinsic material, N-type material (PIN) diode elements are devices that are commonly used as RF switches in RF circuits. One drawback to using PIN diodes is the complexity and power consumption associated with providing the bias current needed in transitioning from an OPEN state to a CLOSED state. The power supply and PA circuitry 24 illustrated in FIG. 8 is similar to the power supply and PA circuitry 24 illustrated in FIG. 5, except in the power supply and PA circuitry 24 illustrated in FIG. 8, the first switching element 50 includes a first PIN diode element CR1 and the second switching element 52 includes a second PIN diode element CR2. Additionally, the switching circuitry 48 further includes a first diode bias circuit 60 and a second diode bias circuit 62.

The first diode bias circuit 60 receives the first power amplifier enable signal PAEN1 and is coupled across the first PIN diode element CR1 to provide the appropriate bias current to select either the OPEN state or the CLOSED state based on the first power amplifier enable signal PAEN1. Similarly, the second diode bias circuit 62 receives the second power amplifier enable signal PAEN2 and is coupled across the second PIN diode element CR2 to select either the OPEN state or the CLOSED state based on the second power amplifier enable signal PAEN2.

Figure 9:
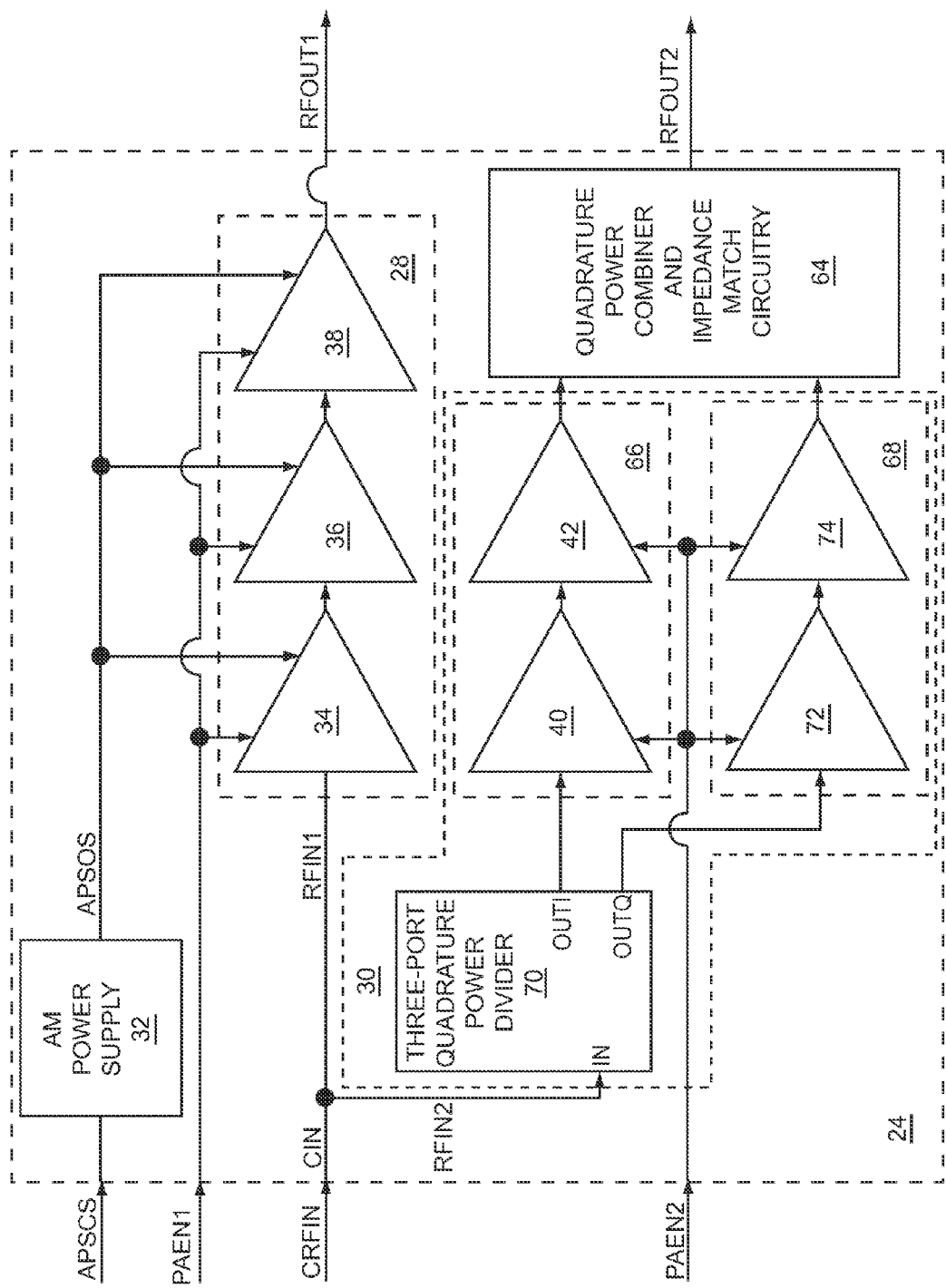
FIG. 9 shows details of the power supply and PA circuitry illustrated in FIG. 1 according to another embodiment of the power supply and PA circuitry.

FIG. 9 shows details of the power supply and PA circuitry 24 illustrated in FIG. 1 according to another embodiment of the power supply and PA circuitry 24. The power supply and PA circuitry 24 illustrated in FIG. 9 is similar to the power supply and PA circuitry 24 illustrated in FIG. 2, except in the power supply and PA circuitry 24 illustrated in FIG. 9, the second PA path 30 is a quadrature path and the power supply and PA circuitry 24 further includes quadrature power combiner and impedance match circuitry 64. The second PA path 30 includes an in-phase PA path 66, a quadrature-phase PA path 68, and a three-port quadrature power divider 70. The three-port quadrature power divider 70 includes an RF input IN, an in-phase output OUTI, and a quadrature-phase output OUTQ. The in-phase PA path 66 includes the second input stage 40 and the second final stage 42 coupled in series between the in-phase output OUTI and the quadrature power combiner and impedance match circuitry 64. The quadrature-phase PA path 68 includes a third input stage 72 and a third final stage 74 coupled in series between the quadrature-phase output OUTQ and the quadrature power combiner and impedance match circuitry 64. The common RF input CIN is coupled to the RF input IN.

The second stages 40, 42 and the third stages 72, 74 receive the second power amplifier enable signal PAEN2 from the control circuitry 26 (FIG. 1). As such, the control circuitry 26 may enable or disable the second stages 40, 42 and the third stages, 72, 74 via the second power amplifier enable signal PAEN2. During the first operating mode, at least the second input stage 40 of the second stages 40, 42 and at least the third input stage 72 of the third stages 72, 74 are disabled and during the second operating mode, the second stages 40, 42 and the third stages 72, 74 are enabled. Alternate embodiments of the in-phase PA path 66 may include any number of PA stages coupled in series and alternate embodiments of the quadrature-phase PA path 68 may include any number of PA stages coupled in series.

During the second operating mode, the three-port quadrature power divider 70 receives, divides, and phase-shifts the second RF input signal RFIN2 into an in-phase RF input signal and a quadrature-phase RF input signal, such that the quadrature-phase RF input signal may be phase-shifted from the in-phase RF input signal by about 90 degrees. Specifically, during the second operating mode, the RF input IN receives the second RF input signal RFIN2, the in-phase output OUTI is coupled to the second input stage 40 and provides the in-phase RF input signal to the second input stage 40 based on dividing the second RF input signal RFIN2, and the quadrature-phase output OUTQ is coupled to the third input stage 72 and provides the quadrature-phase RF input signal to the third input stage 72 based on dividing the second RF input signal RFIN2.

During the second operating mode, the second final stage 42 provides an in-phase RF output signal to the quadrature power combiner and impedance match circuitry 64 based on the second stages 40, 42 amplifying the in-phase RF input signal, and the third final stage 74 provides a quadrature-phase RF output signal to the quadrature power combiner and impedance match circuitry 64 based on the third stages 72, 74 amplifying the quadrature-phase RF input signal. During the second operating mode, the quadrature power combiner and impedance match circuitry 64 phase-shifts and combines the in-phase RF output signal and the quadrature-phase RF output signal to provide the second RF output signal RFOUT2. Further, during the second operating mode, the quadrature power combiner and impedance match circuitry 64 may provide an impedance match to the RF aggregation circuitry 18. Specifically, during the second operating mode, the second RF output signal RFOUT2 is based on a combination of the in-phase RF output signal and the quadrature-phase RF output signal, such that the in-phase RF output signal and the quadrature-phase RF output signal are phase-shifted to be approximately phase-aligned before combining.

The three-port quadrature power divider 70 may have certain characteristics, such that when proper termination impedances are presented to the in-phase output OUTI and to the quadrature-phase output OUTQ, the RF input IN presents a nominal input impedance to the common RF input CIN. Similarly, when high impedances are presented to the in-phase output OUTI and to the quadrature-phase output OUTQ, the RF input IN may present a high impedance to the common RF input CIN. As such, during the first operating mode, the input impedance to the second input stage 40 may be high enough to substantially de-couple the second stages 40, 42 from the common RF input CIN and an input impedance to the third input stage 72 may be high enough to substantially de-couple the third stages 72, 74 from the common RF input CIN. As a result, during the first operating mode, the second PA path 30 may be substantially de-coupled from the common RF input CIN.

Figure 10:
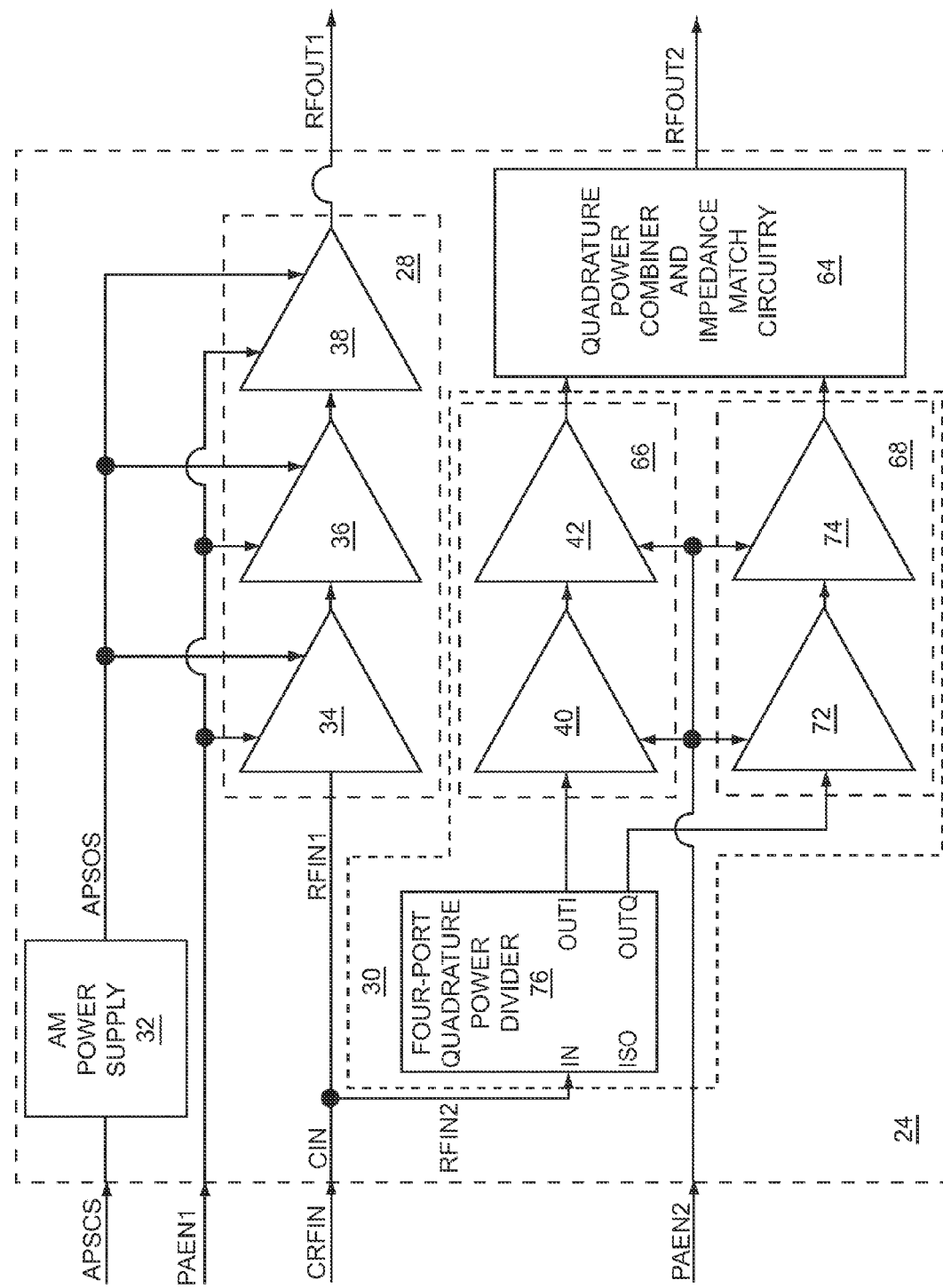
FIG. 10 shows details of a second PA path illustrated in FIG. 9 according to an alternate embodiment of the second PA path.

FIG. 10 shows details of the second PA path 30 illustrated in FIG. 9 according to an alternate embodiment of the second PA path 30. The power supply and PA circuitry 24 illustrated in FIG. 10 is similar to the power supply and PA circuitry 24 illustrated in FIG. 9, except in the power supply and PA circuitry 24 illustrated in FIG. 10, the three-port quadrature power divider 70 is replaced with a four-port quadrature power divider 76. The four-port quadrature power divider 76 is similar to the three-port quadrature power divider 70 in that the four-port quadrature power divider 76 includes the RF input IN, the in-phase output OUTI, and the quadrature-phase output OUTQ. However, the four-port quadrature power divider 76 further includes an isolation output ISO. In the embodiment of the power supply and PA circuitry 24 illustrated in FIG. 10, the isolation output ISO is left unconnected.

Generally, in the four-port quadrature power divider 76, when proper termination impedances are presented to the in-phase output OUTI and to the quadrature-phase output OUTQ, the RF input IN presents a nominal input impedance to the common RF input CIN. As such, during the second operating mode, the four-port quadrature power divider 76 receives, divides, and phase-shifts the second RF input signal RFIN2 into the in-phase RF input signal and the quadrature-phase RF input signal, such that the quadrature-phase RF input signal may be phase-shifted from the in-phase RF input signal by about 90 degrees. Specifically, during the second operating mode, the RF input IN receives the second RF input signal RFIN2 and provides the in-phase RF input signal and the quadrature-phase RF input signal based on dividing the second RF input signal RFIN2.

However, the four-port quadrature power divider 76 may have certain characteristics, such that when proper termination impedances are not presented to the in-phase output OUTI and to the quadrature-phase output OUTQ, all or a portion of RF input signals to the RF input IN may be routed to the isolation output ISO. If a proper termination impedance is presented to the isolation output ISO, then such routed RF signals may be properly processed and the RF input IN may present a nominal input impedance to the common RF input CIN. However, since the isolation output ISO is left unconnected, signals that are routed to the isolation output ISO may be reflected back to the RF input IN. Therefore, a non-nominal input impedance may be presented at the RF input IN during the second operating mode if the proper impedances are not presented to the in-phase output OUTI and the quadrature-phase output OUTQ. However, during the first operating mode, as previously mentioned, high impedances are presented to the in-phase output OUTI and to the quadrature-phase output OUTQ, and since the isolation output ISO is left unconnected, the RF input IN may present a high impedance to the common RF input CIN. As such, since during the first operating mode, the input impedance to the second input stage 40 may be high enough to substantially de-couple the second stages 40, 42 from the common RF input CIN and since the input impedance to the third input stage 72 may be high enough to substantially de-couple the third stages 72, 74 from the common RF input CIN, the second PA path 30 may be substantially de-coupled from the common RF input CIN. Therefore, the main shortcoming of the power supply and PA circuitry 24 illustrated in FIG. 10 may be the proper processing of signals by the second PA path 30 during the second operating mode.

Figure 11:
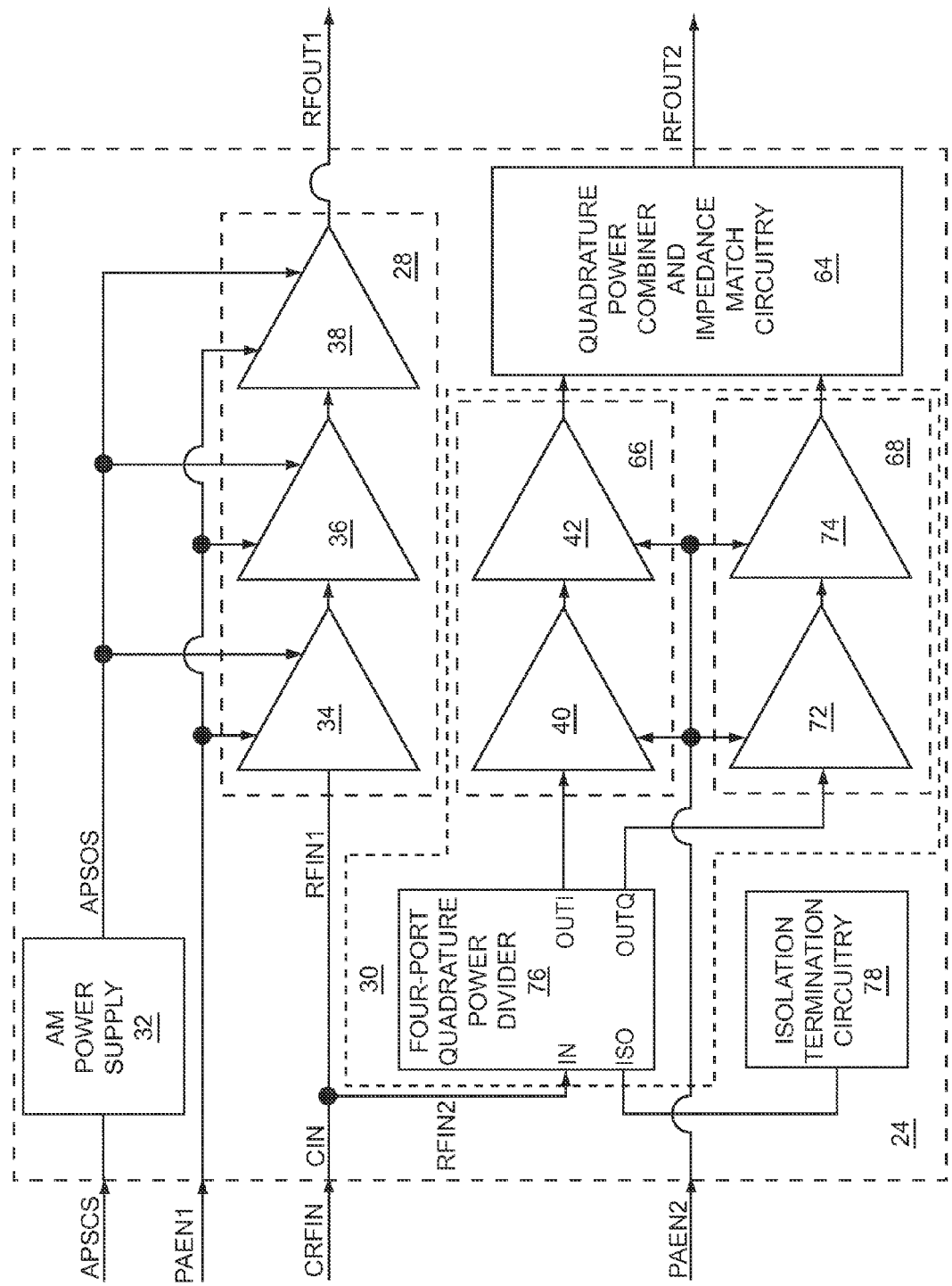
FIG. 11 shows details of the power supply and PA circuitry illustrated in FIG. 10 according to one embodiment of the power supply and PA circuitry.

FIG. 11 shows details of the power supply and PA circuitry 24 illustrated in FIG. 10 according to one embodiment of the power supply and PA circuitry 24. The power supply and PA circuitry 24 illustrated in FIG. 11 is similar to the power supply and PA circuitry 24 illustrated in FIG. 10, except the power supply and PA circuitry 24 illustrated in FIG. 11 further includes isolation termination circuitry 78 coupled to the isolation output ISO. The isolation termination circuitry 78 may present an impedance to the isolation output ISO to provide a desirable trade-off between behavior of the four-port quadrature power divider 76 during the first operating mode and behavior of the four-port quadrature power divider 76 during the second operating mode.

Figure 12:
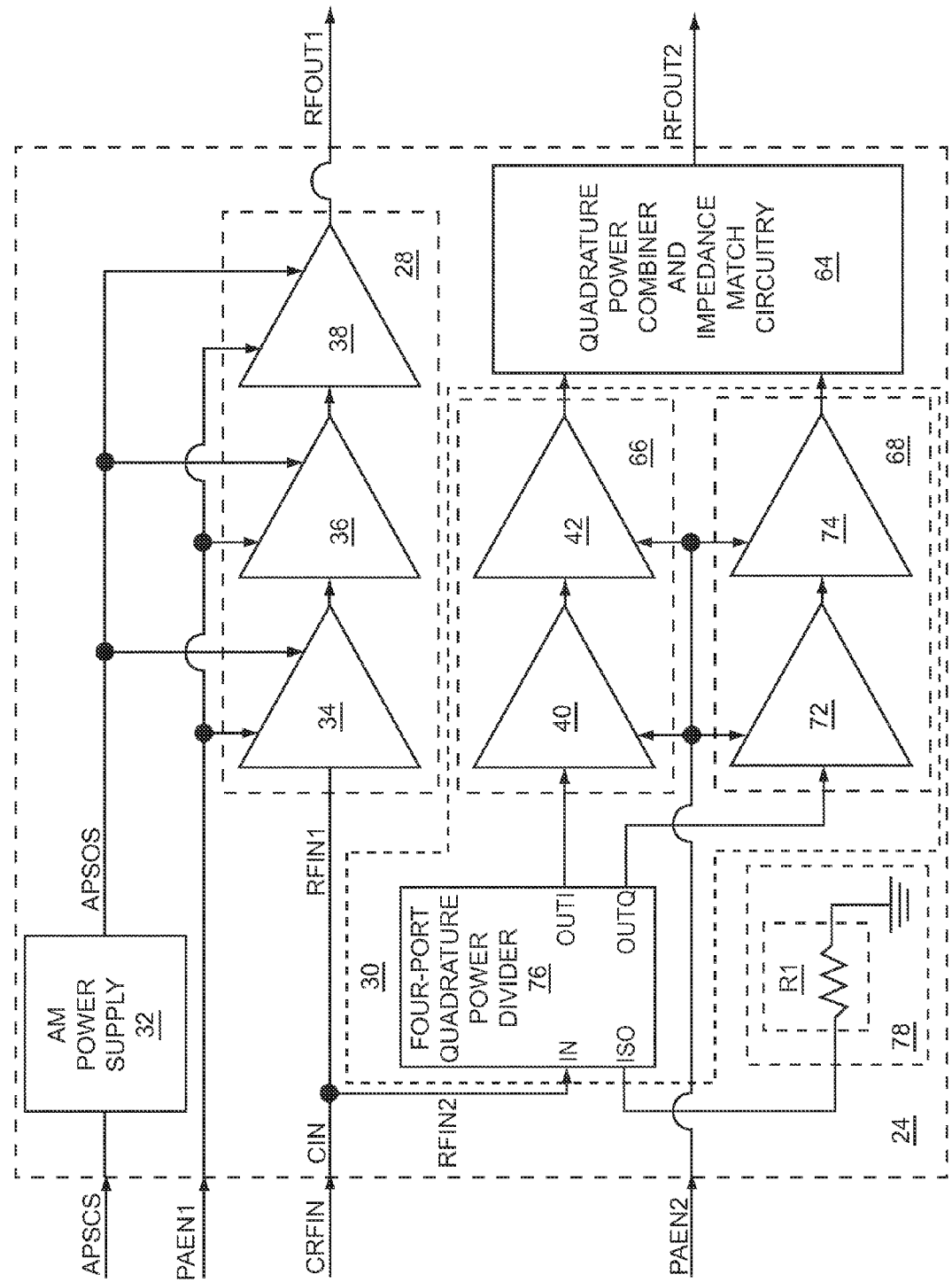
FIG. 12 shows details of isolation termination circuitry illustrated in FIG. 11 according to one embodiment of the isolation termination circuitry.

FIG. 12 shows details of the isolation termination circuitry 78 illustrated in FIG. 11 according to an alternate embodiment of the isolation termination circuitry 78. The isolation termination circuitry 78 includes a termination resistive element R1 coupled between the isolation output ISO and ground. As such, the termination resistive element R1 may present an impedance to the isolation output ISO to provide a desirable trade-off between behavior of the four-port quadrature power divider 76 during the first operating mode and behavior of the four-port quadrature power divider 76 during the second operating mode.

Figure 13:
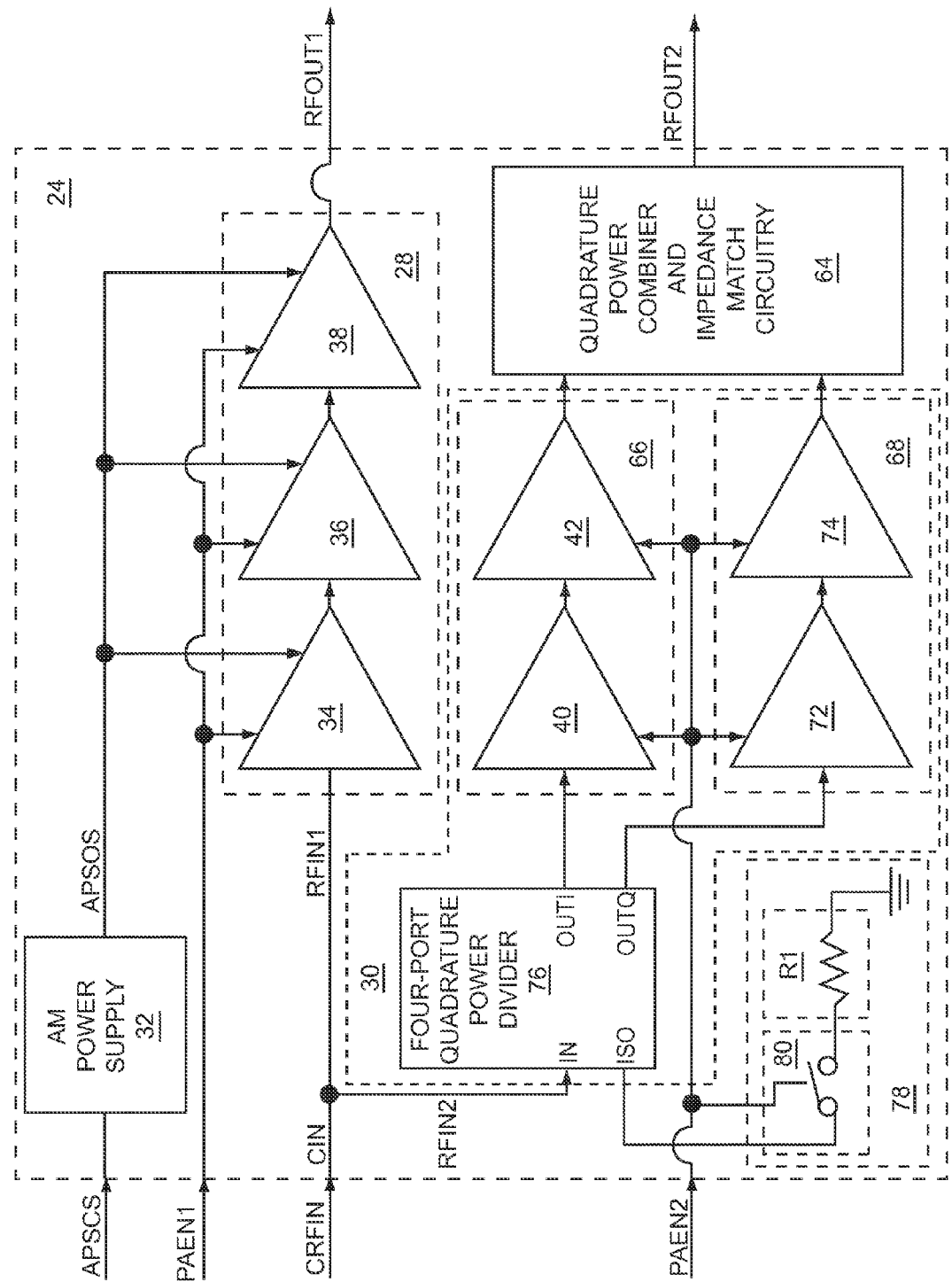
FIG. 13 shows details of the isolation termination circuitry illustrated in FIG. 11 according to an alternate embodiment of the isolation termination circuitry.

FIG. 13 shows details of the isolation termination circuitry 78 illustrated in FIG. 11 according to an additional embodiment of the isolation termination circuitry 78. The isolation termination circuitry 78 includes the termination resistive element R1 and an isolation switching element 80 coupled in series between the isolation output ISO and ground. The isolation switching element 80 receives and is controlled by the second power amplifier enable signal PAEN2, such that during the first operating mode, the isolation switching element 80 is on an OPEN state to substantially de-couple the isolation output ISO from the termination resistive element R1, and during the second operating mode, the isolation switching element 80 is in a CLOSED state to provide a termination impedance to the isolation output ISO via the termination resistive element R1.

Specifically, during the first operating mode, since the in-phase output OUTI, the quadrature-phase output OUTQ, and the isolation output ISO are substantially de-coupled from their respective mating circuits, the RF input IN presents a high enough impedance to the common RF input CIN to substantially de-couple the second PA path 30 from the common RF input CIN. Further, during the second operating mode, since the isolation output ISO may be properly terminated, the RF input IN may present a nominal impedance to the common RF input CIN, even if the in-phase output OUTI and the quadrature-phase output OUTQ are not properly terminated.

Figure 14:
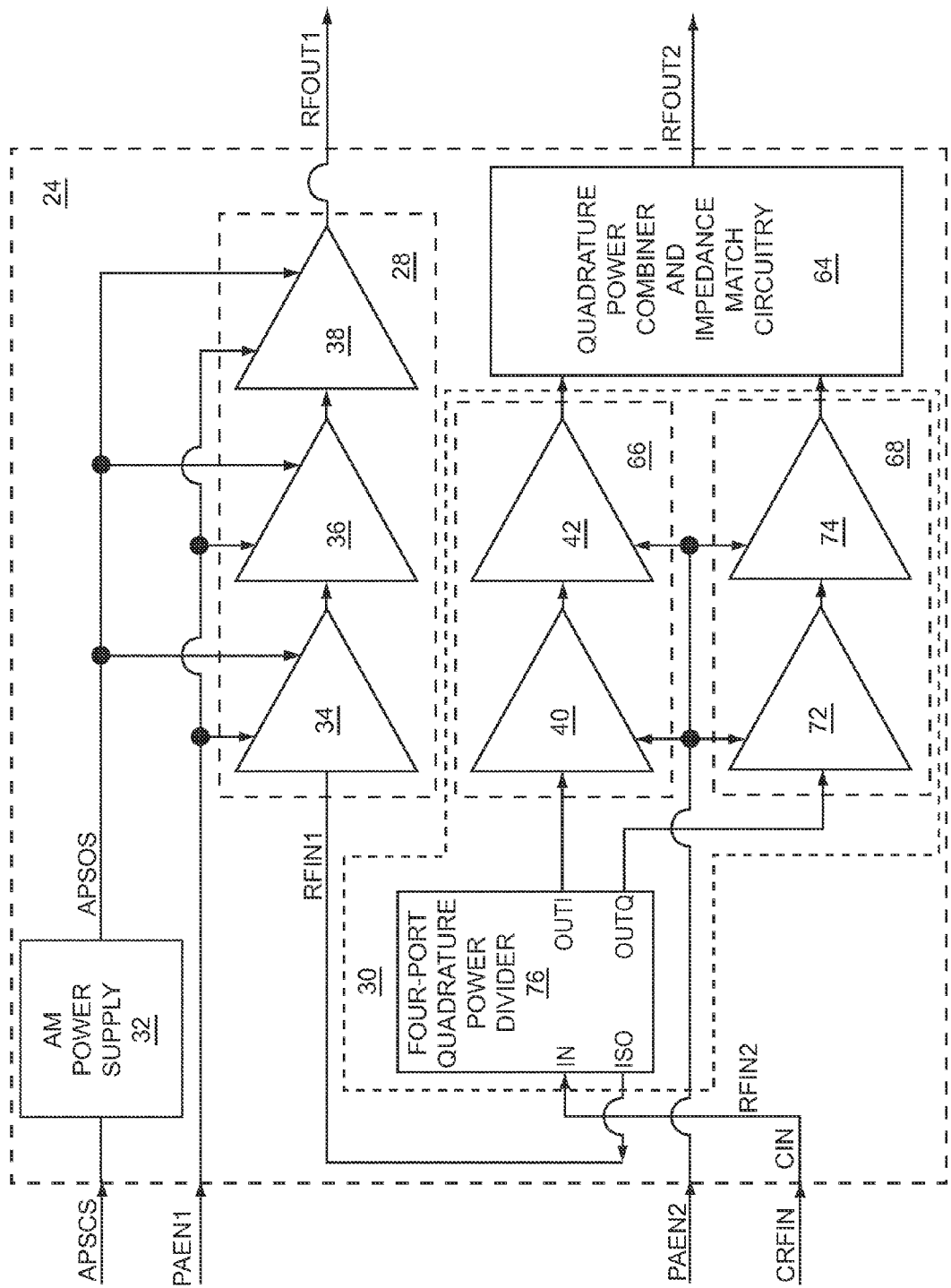
FIG. 14 shows details of the power supply and PA circuitry illustrated in FIG. 10 according to an alternate embodiment of the power supply and PA circuitry.

FIG. 14 shows details of the power supply and PA circuitry 24 illustrated in FIG. 10 according to an alternate embodiment of the power supply and PA circuitry 24. The power supply and PA circuitry 24 illustrated in FIG. 14 is similar to the power supply and PA circuitry 24 illustrated in FIG. 10, except in the power supply and PA circuitry 24 illustrated in FIG. 14, the input to the first input stage 34 is coupled to the isolation output ISO instead of being coupled to the common RF input CIN. As such, during the first operating mode, the input impedance to the second input stage 40 and the input impedance to the third input stage 72 are high enough to cause the four-port quadrature power divider 76 to at least partially route the common RF input signal CRFIN to the first input stage 34 via the isolation output ISO. As such, during the first operating mode, the isolation output ISO provides the first RF input signal RFIN1. During the second operating mode, the second PA path 30 may function similarly to the second PA path 30 illustrated in FIG. 10.

Figure 15:
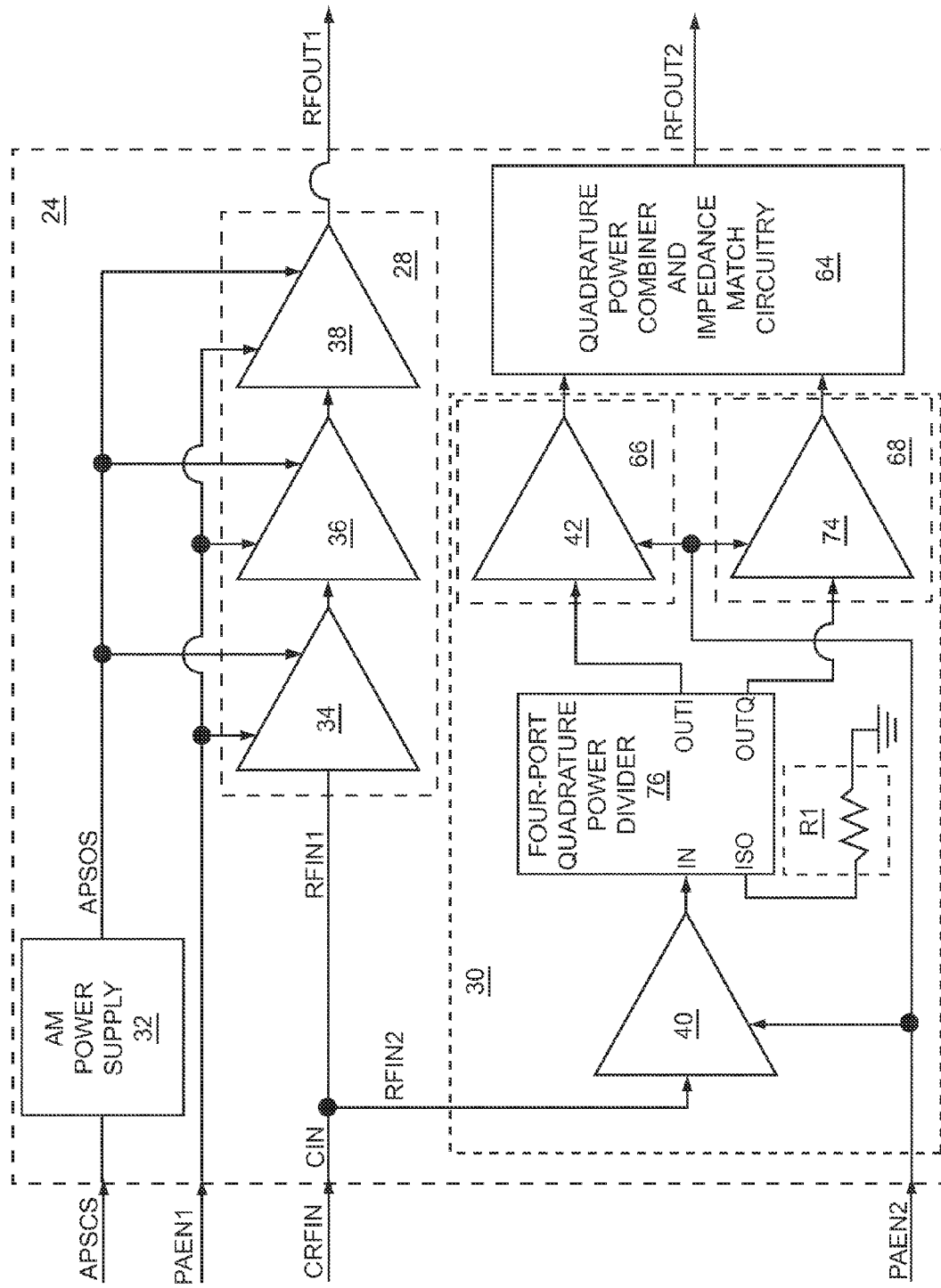
FIG. 15 shows details of the power supply and PA circuitry illustrated in FIG. 10 according to an additional embodiment of the power supply and PA circuitry.

FIG. 15 shows details of the power supply and PA circuitry 24 illustrated in FIG. 10 according to an additional embodiment of the power supply and PA circuitry 24. The power supply and PA circuitry 24 illustrated in FIG. 15 is similar to the power supply and PA circuitry 24 illustrated in FIG. 12, except in the power supply and PA circuitry 24 illustrated in FIG. 15, the third input stage 72 has been removed from the quadrature-phase PA path 68 and the second input stage 40 has been moved from the in-phase PA path 66 to between the common RF input CIN and the RF input IN of the four-port quadrature power divider 76.

During the first operating mode, the first input stage 34 receives the first RF input signal RFIN1 and the first final stage 38 provides the first RF output signal RFOUT1 based on amplifying the first RF input signal RFIN1, and during the second operating mode, the input impedance to the first input stage 34 is high enough to substantially de-couple the first PA path 28 from the common RF input CIN. During the first operating mode, the input impedance to the second input stage 40 is high enough to substantially de-couple the second input stage 40 from the common RF input CIN, and during the second operating mode, the second input stage 40 receives and amplifies the second RF input signal RFIN2 to provide an amplified RF input signal to the RF input IN.

During the second operating mode, the RF input IN receives the amplified RF input signal, the in-phase output OUTI is coupled to the in-phase PA path 66 and provides the in-phase RF input signal to the in-phase PA path 66 based on dividing the second RF input signal RFIN2, and the quadrature-phase output OUTQ is coupled to the quadrature-phase PA path 68 and provides the quadrature-phase RF input signal to the quadrature-phase PA path 68 based on dividing the second RF input signal RFIN2. During the second operating mode, the in-phase PA path 66 provides the in-phase RF output signal based on amplifying the in-phase RF input signal and the quadrature-phase PA path 68 provides the quadrature-phase RF output signal based on amplifying the quadrature-phase RF input signal. During the second operating mode, the quadrature power combiner and impedance match circuitry 64 provides the second RF output signal RFOUT2 based on the combination of the in-phase RF output signal and the quadrature-phase RF output signal. The in-phase PA path 66 includes the second final stage 42 and the quadrature-phase PA path 68 includes the third final stage 74. Alternate embodiments of the in-phase PA path 66 and the quadrature-phase PA path 68 may include any number of PA stages coupled in series.

A number of different commonly available architectures may be suitable for the four-port quadrature power divider 76, including but not limited to: coupled transmission lines, a lumped element equivalent of coupled transmission lines, a Lange coupler, a lumped element equivalent of a Lange coupler, in-phase combiners coupled to phase shift networks, directional branchline couplers, or directional overlay couplers. The four-port quadrature power divider 76 may include stripline technology, lumped elements, or both. One commercially available four-port quadrature power divider 76 is Hybrid Coupler Model XC1900A-03 provided by Anaren.

The term "substantially de-couple" is used several times in the present disclosure regarding different aspects of the power supply and PA circuitry 24. As such, the term "substantially de-couple" is defined as not necessarily perfect isolation, but enough isolation to allow the power supply and PA circuitry 24 to function in a desired manner. Perfect isolation means that no current flows under any circumstances. Non-perfect isolation means some currents, such as leakage currents or OFF state currents, may flow.

Some of the circuitry previously described may use discrete circuitry, integrated circuitry, programmable circuitry, non-volatile circuitry, volatile circuitry, software executing instructions on computing hardware, firmware executing instructions on computing hardware, the like, or any combination thereof. The computing hardware may include mainframes, micro-processors, micro-controllers, DSPs, the like, or any combination thereof.

None of the embodiments of the present disclosure are intended to limit the scope of any other embodiment of the present disclosure. Any or all of any embodiment of the present disclosure may be combined with any or all of any other embodiment of the present disclosure to create new embodiments of the present disclosure.

Those skilled in the art will recognize improvements and modifications to the preferred embodiments of the present disclosure. All such improvements and modifications are considered within the scope of the concepts disclosed herein and the claims that follow.

What is claimed is:

1. Multi-mode radio frequency (RF) power amplifier (PA) circuitry comprising:
   a common RF input adapted to receive a common RF input signal;
   a first PA path comprising a first plurality of PA stages coupled in series, such that during a first operating mode, a first input stage of the first plurality of PA stages is adapted to receive a first RF input signal and a first final stage of the first plurality of PA stages is adapted to provide a first RF output signal and the first PA path adapted to:
      during the first operating mode, receive and amplify the first RF input signal based on the common RF input signal to provide the first RF output signal; and
      during a second operating mode, substantially de-couple the first PA path from the common RF input;
   a second PA path comprising a second plurality of PA stages coupled in series, such that during the second operating mode, a second input stage of the second plurality of PA stages is adapted to receive a second RF input signal and a second final stage of the second plurality of PA stages is adapted to provide a second RF output signal and the second PA path adapted to:
      during the first operating mode, substantially de-couple the second PA path from the common RF input; and
      during the second operating mode, receive and amplify the second RF input signal based on the common RF input signal to provide the second RF output signal; and
   control circuitry adapted to select between the first operating mode and the second operating mode; and wherein
   each of the first plurality of PA stages is adapted to receive the corresponding PA enable signal, such that during the first operating mode, each of the first plurality of PA stages is enabled and during the second operating mode, each of the first plurality of PA stages is disabled; and
   each of the second plurality of PA stages is adapted to receive the corresponding PA enable signal, such that during the first operating mode, each of the second plurality of PA stages is disabled and during the second operating mode, each of the second plurality of PA stages is enabled.

2. The multi-mode RF PA circuitry of claim 1 wherein transceiver circuitry is coupled to the common RF input and adapted to provide the common RF input signal.

3. The multi-mode RF PA circuitry of claim 1 wherein:
   during the first operating mode, the common RF input signal is one selected from the group consisting of a Global System for Mobile communications (GSM) transmit signal and an Enhanced Data Rates for GSM Evolution (EDGE) transmit signal; and
   during the second operating mode, the common RF input signal is a Wideband Code Division Multiple Access (WCDMA) transmit signal.

4. The multi-mode RF PA circuitry of claim 1 wherein:
   during the first operating mode, an input impedance to the second input stage is high enough to substantially de-couple the second PA path from the common RF input; and
   during the second operating mode, an input impedance to the first input stage is high enough to substantially de-couple the first PA path from the common RF input.

5. The multi-mode RF PA circuitry of claim 4 wherein an input to the first input stage is directly coupled to the common RF input and an input to the second input stage is directly coupled to the common RF input, such that the during the first operating mode, the first RF input signal is essentially equivalent to the common RF input signal and during the second operating mode, the second RF input signal is essentially equivalent to the common RF input signal.

6. Multi-mode radio frequency (RF) power amplifier (PA) circuitry comprising:
   a common RF input adapted to receive a common RF input signal;
   a first PA path adapted to:

during a first operating mode, receive and amplify a first RF input signal based on the common RF input signal to provide a first RF output signal; and during a second operating mode, substantially de-couple the first PA path from the common RF input;

a second PA path adapted to:

during the first operating mode, substantially de-couple the second PA path from the common RF input; and during the second operating mode, receive and amplify a second RF input signal based on the common RF input signal to provide a second RF output signal; and control circuitry adapted to select between the first operating mode and the second operating mode;

wherein:

during the first operating mode, the common RF input signal is one selected from the group consisting of a Global System for Mobile communications (GSM) transmit signal and an Enhanced Data Rates for GSM Evolution (EDGE) transmit signal; and during the second operating mode, the common RF input signal is a Wideband Code Division Multiple Access (WCDMA) transmit signal; and wherein:

the first PA path comprises a first plurality of PA stages coupled in series, such that during the first operating mode, a first input stage of the first plurality of PA stages is adapted to receive the first RF input signal and a first final stage of the first plurality of PA stages is adapted to provide the first RF output signal; and the second PA path comprises a second plurality of PA stages coupled in series, such that during the second operating mode, a second input stage of the second plurality of PA stages is adapted to receive the second RF input signal and a second final stage of the second plurality of PA stages is adapted to provide the second RF output signal.

7. The multi-mode RF PA circuitry of claim 6 wherein:

each of the first plurality of PA stages is adapted to receive a corresponding PA enable signal, such that during the first operating mode, each of the first plurality of PA stages is enabled and during the second operating mode, each of the first plurality of PA stages is disabled; and each of the second plurality of PA stages is adapted to receive a corresponding PA enable signal, such that during the first operating mode, each of the second plurality of PA stages is disabled and during the second operating mode, each of the second plurality of PA stages is enabled.

8. The multi-mode RF PA circuitry of claim 4 wherein:

the first input stage comprises a first heterojunction bipolar transistor (HBT) element, such that a base of the first HBT element is coupled to an input to the first input stage, and the input to the first input stage provides the input impedance to the first input stage; and the second input stage comprises a second HBT element, such that a base of the second HBT element is coupled to an input to the second input stage, and the input to the second input stage provides the input impedance to the second input stage.

9. The multi-mode RF PA circuitry of claim 8 wherein:

the first HBT element is a Gallium Arsenide (GaAs) HBT element; and the second HBT element is a GaAs HBT element.

10. The multi-mode RF PA circuitry of claim 1 wherein:

during the first operating mode, at least one of the first plurality of PA stages is adapted to operate in a saturated mode; and during the second operating mode, each of the second plurality of PA stages is adapted to operate in a linear mode.

11. The multi-mode RF PA circuitry of claim 1 wherein:

the first PA path comprises the first plurality of PA stages coupled in series, such that during the first operating mode, the first input stage of the first plurality of PA stages is adapted to receive the first RF input signal and the first final stage of the first plurality of PA stages is adapted to provide the first RF output signal, and during the second operating mode, an input impedance to the first input stage is high enough to substantially de-couple the first PA path from the common RF input; and the second PA path comprises:

a quadrature power divider having:

the RF input coupled to the common RF input and adapted to during the second operating mode, receive the second RF input signal;

an in-phase output coupled to the second input stage of the second plurality of PA stages and adapted to during the second operating mode, provide an in-phase RF input signal to the second input stage based on dividing the second RF input signal; and a quadrature-phase output coupled to a third input stage of a third plurality of PA stages and adapted to during the second operating mode, provide a quadrature-phase RF input signal to the third input stage based on dividing the second RF input signal;

the second plurality of PA stages coupled in series, such that during the second operating mode, the second final stage of the second plurality of PA stages is adapted to provide an in-phase RF output signal based on amplifying the in-phase RF input signal and during the first operating mode, the input impedance to the second input stage is high enough to substantially de-couple the second plurality of PA stages from the common RF input; and the third plurality of PA stages coupled in series, such that during the second operating mode, a third final stage of the third plurality of PA stages is adapted to provide a quadrature-phase RF output signal based on amplifying the quadrature-phase RF input signal and during the first operating mode, the input impedance to the third input stage is high enough to substantially de-couple the third plurality of PA stages from the common RF input, wherein the second RF output signal is based on a combination of the in-phase RF output signal and the quadrature-phase RF output signal.

12. The multi-mode RF PA circuitry of claim 11 further comprising isolation termination circuitry having at least a termination resistive element coupled to an isolation output from the quadrature power divider, which is adapted to route RF signals resulting from improper terminations at the in-phase output and the quadrature-phase output to the isolation output.

13. The multi-mode RF PA circuitry of claim 12 wherein the isolation termination circuitry further comprises an isolation switching element coupled in series with the termination resistive element to the isolation output, such that during the first operating mode, the isolation switching element is in an OPEN state to substantially de-couple the isolation output from the termination resistive element and during the second operating mode, the first switching element is in a CLOSED state to provide a termination impedance to the isolation output.

14. The multi-mode RF PA circuitry of claim 11 wherein the quadrature power divider has an isolation output coupled to the first input stage, such that during the first operating mode, the input impedance to the second input stage and the input impedance to the third input stage are high enough to cause the common RF input signal to be at least partially routed to the isolation output.

15. The multi-mode RF PA circuitry of claim 1 wherein:
the first PA path comprises the first plurality of PA stages coupled in series, such that during the first operating mode, the first input stage of the first plurality of PA stages is adapted to receive the first RF input signal and the first final stage of the first plurality of PA stages is adapted to provide the first RF output signal, and during the second operating mode, an input impedance to the first input stage is high enough to substantially de-couple the first PA path from the common RF input; and
the second PA path comprises:
at least the second input stage coupled between the common RF input and the RF input to a quadrature power divider, such that:
during the first operating mode, the input impedance to the second input stage is high enough to substantially de-couple the second input stage from the common RF input; and
during the second operating mode, the second input stage is adapted to receive and amplify the second RF input signal to provide an amplified RF input signal;
the quadrature power divider having:
the RF input adapted to during the second operating mode, receive the amplified RF input signal;
an in-phase output coupled to an in-phase PA path and adapted to during the second operating mode, provide an in-phase RF input signal to the in-phase PA path based on dividing the second RF input signal; and
a quadrature-phase output coupled to a quadrature-phase PA path and adapted to during the second operating mode, provide a quadrature-phase RF input signal to the quadrature-phase PA path based on dividing the second RF input signal; and
the in-phase PA path, such that during the second operating mode, the in-phase PA path is adapted to provide an in-phase RF output signal based on amplifying the in-phase RF input signal; and
the quadrature-phase PA path, such that during the second operating mode, the quadrature-phase PA path is adapted to provide a quadrature-phase RF output signal based on amplifying the quadrature-phase RF input signal,
wherein the second RF output signal is based on a combination of the in-phase RF output signal and the quadrature-phase RF output signal.

16. A method comprising:
receiving a common RF input signal into a common RF input;
selecting between a first operating mode and a second operating mode;
during the first operating mode, receiving and amplifying a first RF input signal based on the common RF input signal to provide a first RF output signal via a first power amplifier (PA) path comprising a plurality of PA stages coupled in series, such that during the first operating mode, a first input stage of a first plurality of PA stages is adapted to receive the first RF input signal and a first final stage of the first plurality of PA stages is adapted to provide the first RF output signal, wherein each of the first plurality of PA stages is adapted to receive a corresponding PA enable signal, such that during the first operating mode, each of the first plurality of PA stages is enabled and during the second operating mode, each of the first plurality of PA stages is disabled;
during the second operating mode, substantially de-coupling the first PA path from the common RF input;
during the first operating mode, substantially de-coupling a second PA path from the common RF input, wherein the second PA path comprises a second plurality of PA stages coupled in series, such that during the second operating mode, a second input stage of the second plurality of PA stages is adapted to receive a second RF input signal and a second final stage of the second plurality of PA stages is adapted to provide a second RF output signal wherein each of the second plurality of PA stages is adapted to receive the corresponding PA enable signal, such that during the first operating mode, each of the second plurality of PA stages is disabled and during the second operating mode, each of the second plurality of PA stages is enabled; and
during the second operating mode, receiving and amplifying the second RF input signal based on the common RF input signal to provide the second RF output signal via the second PA path.

17. The method of claim 16 further comprising:
during the first operating mode, providing an input impedance to the second input stage that is high enough to substantially de-couple the second PA path from the common RF input; and
during the second operating mode, providing the input impedance to the first input stage that is high enough to substantially de-couple the first PA path from the common RF input.

18. The method of claim 17 further comprising directly coupling an input to the first input stage to the common RF input and directly coupling the input to the second input stage to the common RF input, such that the during the first operating mode, the first RF input signal is essentially equivalent to the common RF input signal and during the second operating mode, the second RF input signal is essentially equivalent to the common RF input signal.

19. The multi-mode RF PA circuitry of claim 6 wherein:
the first input stage is adapted to receive a first PA enable signal to control the first input stage, such that during the first operating mode, the first input stage is enabled and during the second operating mode, the first input stage is disabled; and
the second input stage is adapted to receive a second PA enable signal to control the second input stage, such that during the first operating mode, the second input stage is disabled and during the second operating mode, the second input stage is enabled.

* * * * *